(12) United States Patent
Blevins et al.

(10) Patent No.: US 10,797,573 B2
(45) Date of Patent: Oct. 6, 2020

(54) AXIAL MOTOR/GENERATOR HAVING MULTIPLE INLINE STATORS AND ROTORS WITH STACKED/LAYERED PERMANENT MAGNETS, COILS, AND A CONTROLLER

(71) Applicant: Power IT Perfect, Inc., Charlotte, NC (US)

(72) Inventors: Larry James Blevins, North Wilkesboro, NC (US); Travis Ray Neely, Murphy, TX (US)

(73) Assignee: POWER IT PERFECT, INC., Plano, TX (US)

( * ) Notice: Subject to any disclaimer, the term of this patent is extended or adjusted under 35 U.S.C. 154(b) by 104 days.

(21) Appl. No.: 15/851,969

(22) Filed: Dec. 22, 2017

(65) Prior Publication Data
US 2018/0278133 A1    Sep. 27, 2018

Related U.S. Application Data

(63) Continuation-in-part of application No. 14/448,445, filed on Jul. 31, 2014, now Pat. No. 10,298,104.
(Continued)

(51) Int. Cl.
*H02K 16/00* (2006.01)
*H02K 1/18* (2006.01)
(Continued)

(52) U.S. Cl.
CPC ............. *H02K 16/00* (2013.01); *H02K 1/182* (2013.01); *H02K 1/2793* (2013.01); *H02K 5/225* (2013.01);
(Continued)

(58) Field of Classification Search
CPC ...... H02K 21/24; H02K 11/215; H02K 11/33; H02K 5/225; H02K 7/08; H02K 19/34;
(Continued)

(56) References Cited

U.S. PATENT DOCUMENTS

| | | | | |
|---|---|---|---|---|
| 4,535,263 A | * | 8/1985 | Avery | H02K 26/00 310/112 |
| 5,021,698 A | * | 6/1991 | Pullen | H02K 1/2793 310/112 |

(Continued)

OTHER PUBLICATIONS

Transformer And Inductor Design Handbook, Third Edition by Colonel Wm Tl McLyman, 2004 (Year: 2004).*

*Primary Examiner* — Maged M Almawri
(74) *Attorney, Agent, or Firm* — Haynes and Boone, LLP

(57) ABSTRACT

An axial electric motor/generator having an inline stator and an inline rotor is provided. In one exemplary embodiment, a system comprises a housing, a shaft, and a slice assembly disposed about the shaft. The slice assembly includes a rotor assembly having a rotor plate and a set of isolated permanent magnets. A magnetic flux of each permanent magnet flows in an opposite direction to that of each adjacent permanent magnet. The slice assembly also includes a stator assembly having a stator plate and a set of isolated coil assemblies. Each coil assembly has an insulated wire wound about a metal core. The wound wire is normal to the magnetic flux of each permanent magnet when proximate the corresponding coil assembly. At least one of the set of isolated coil assemblies is configurable to output electrical power while the shaft is rotating or to input electrical power to rotate the shaft.

16 Claims, 21 Drawing Sheets

Related U.S. Application Data

(60) Provisional application No. 61/980,182, filed on Apr. 16, 2014.

(51) Int. Cl.
   *H02K 5/22* (2006.01)
   *H02K 1/27* (2006.01)
   *H02K 21/24* (2006.01)
   *H02K 16/04* (2006.01)

(52) U.S. Cl.
   CPC ............ *H02K 16/04* (2013.01); *H02K 21/24* (2013.01); *H02K 2213/03* (2013.01); *H02K 2213/12* (2013.01)

(58) Field of Classification Search
   CPC .............. H02K 19/36; H02K 2213/03; H02K 2213/12; H02K 16/00; H02K 16/04; H02K 1/2793; H02K 1/182; H02P 3/22
   USPC ........... 310/112, 113, 114, 115, 67 A, 49.22, 310/49.23, 49.29, 49.34, 102 R, 107, 44, 310/216.067, 216.066
   See application file for complete search history.

(56) References Cited

U.S. PATENT DOCUMENTS

| | | | | |
|---|---|---|---|---|
| 5,912,522 | A * | 6/1999 | Rivera | H02K 3/28 310/184 |
| 5,982,074 | A * | 11/1999 | Smith | H02K 3/04 310/156.36 |
| 6,437,529 | B1 * | 8/2002 | Brown | H02K 16/04 318/400.21 |
| 6,483,219 | B2 * | 11/2002 | Nikolic | H02K 31/00 310/178 |
| 7,081,696 | B2 * | 7/2006 | Ritchey | H02K 7/108 310/114 |
| 7,777,391 | B2 * | 8/2010 | Asano | H02K 1/148 310/156.57 |
| 7,973,443 | B2 * | 7/2011 | Nakamasu | H02K 1/2793 310/156.62 |
| 8,614,529 | B2 * | 12/2013 | Ritchey | H02K 7/108 310/78 |
| 8,688,345 | B2 * | 4/2014 | Boughtwood | B60L 50/52 701/71 |
| 9,287,755 | B2 * | 3/2016 | Woolmer | H02K 1/14 |
| 9,685,827 | B2 * | 6/2017 | Ritchey | H02K 7/108 |
| 9,800,111 | B2 * | 10/2017 | Palmer | H02K 16/00 |
| 9,812,981 | B2 * | 11/2017 | Ritchey | H02P 25/18 |
| 2004/0084980 | A1 * | 5/2004 | Yamaguchi | H02K 7/063 310/81 |
| 2005/0127769 | A1 * | 6/2005 | Minagawa | H02K 21/24 310/156.32 |
| 2006/0033393 | A1 * | 2/2006 | Ritchey | H02K 7/108 310/112 |
| 2006/0131986 | A1 * | 6/2006 | Hsu | H02K 21/24 310/268 |
| 2006/0284507 | A1 * | 12/2006 | Murakami | H02K 1/2793 310/156.37 |
| 2008/0018187 | A1 * | 1/2008 | Yamaguchi | H02K 29/03 310/81 |
| 2008/0088200 | A1 * | 4/2008 | Ritchey | H02K 16/00 310/268 |
| 2008/0231132 | A1 * | 9/2008 | Minowa | H02K 16/00 310/114 |
| 2009/0302808 | A1 * | 12/2009 | Patel | H02K 53/00 322/4 |
| 2010/0148611 | A1 * | 6/2010 | Wang | H02K 1/14 310/156.37 |
| 2010/0187934 | A1 * | 7/2010 | Asano | H02K 1/2793 310/156.32 |
| 2010/0219707 | A1 * | 9/2010 | Nadeau | H02K 21/24 310/112 |
| 2010/0253085 | A1 * | 10/2010 | Minowa | F03D 9/25 290/55 |
| 2011/0095628 | A1 * | 4/2011 | Enomoto | H02K 1/148 310/44 |
| 2011/0121576 | A1 * | 5/2011 | Bayko | H02K 7/183 290/55 |
| 2012/0024610 | A1 * | 2/2012 | Woolmer | H02K 5/18 180/65.51 |
| 2012/0104880 | A1 * | 5/2012 | Takemoto | H02K 1/2793 310/44 |
| 2012/0133231 | A1 * | 5/2012 | Hayakawa | H02K 21/24 310/156.37 |
| 2012/0215389 | A1 * | 8/2012 | Perry | B60K 6/48 701/22 |
| 2012/0229060 | A1 * | 9/2012 | Ritchey | H02P 25/18 318/400.3 |
| 2012/0235530 | A1 * | 9/2012 | Moya | H02K 1/148 310/156.01 |
| 2012/0262022 | A1 * | 10/2012 | Takemoto | H02K 1/2793 310/156.35 |
| 2013/0134839 | A1 * | 5/2013 | Boughtwood | B60L 7/006 310/67 R |
| 2014/0054998 | A1 * | 2/2014 | Kim | H02K 1/27 310/156.07 |
| 2014/0084743 | A1 * | 3/2014 | Nadeau | H02K 21/145 310/216.113 |
| 2016/0065020 | A1 * | 3/2016 | Tokoi | H02K 1/02 310/156.08 |
| 2018/0323679 | A1 * | 11/2018 | Woolmer | H02K 15/03 |

* cited by examiner

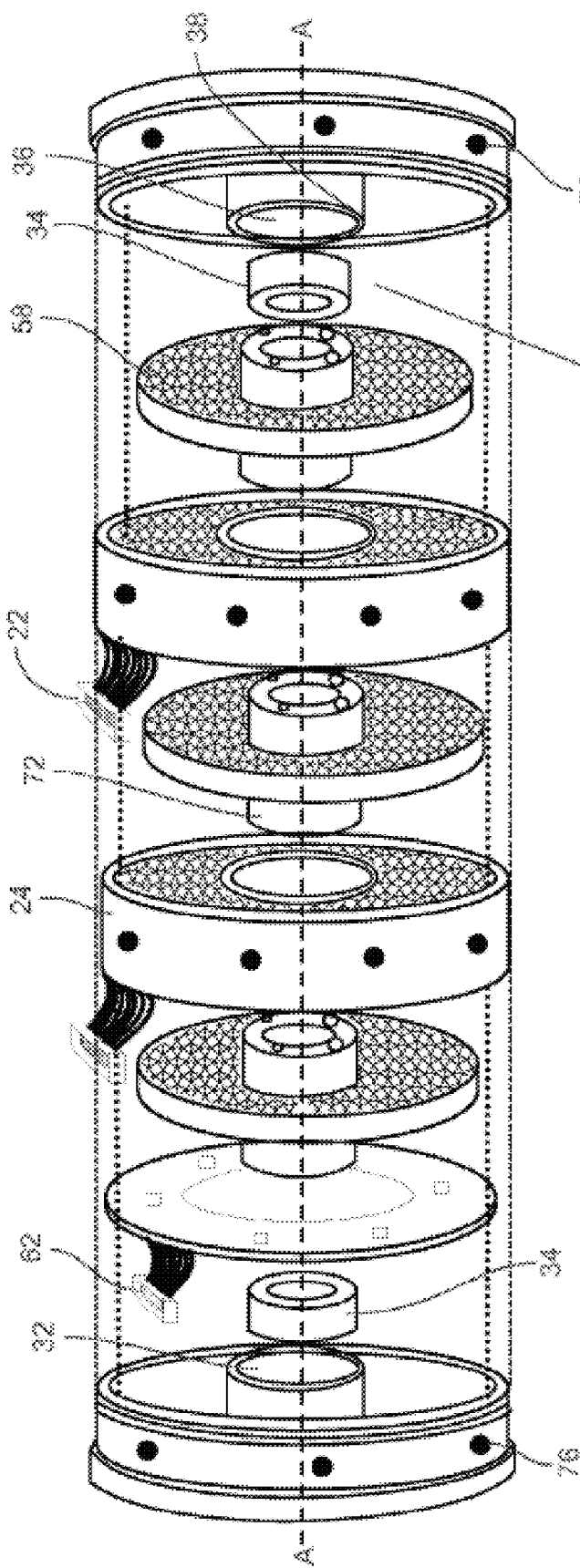
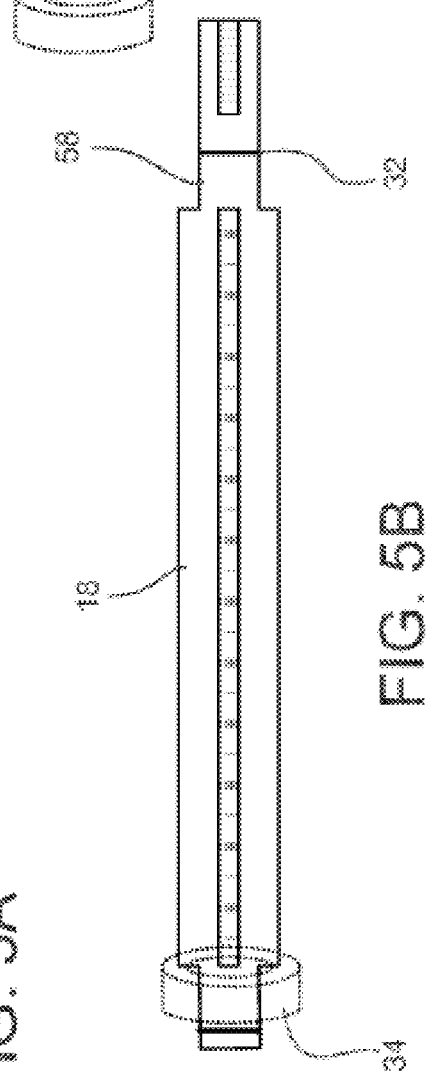
FIG. 5A
FIG. 5B

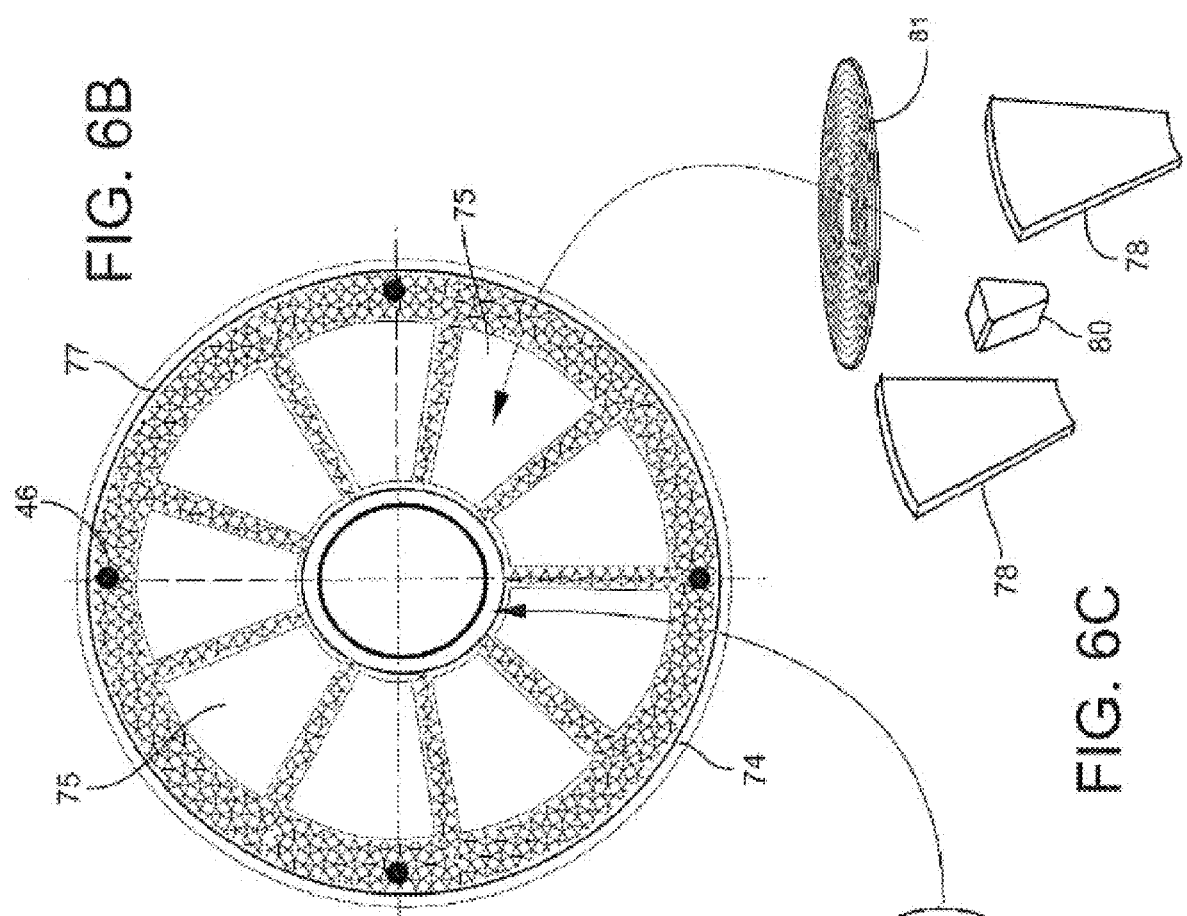
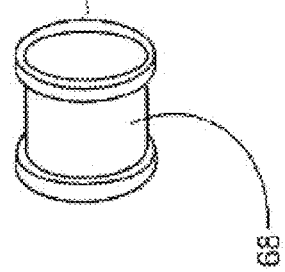
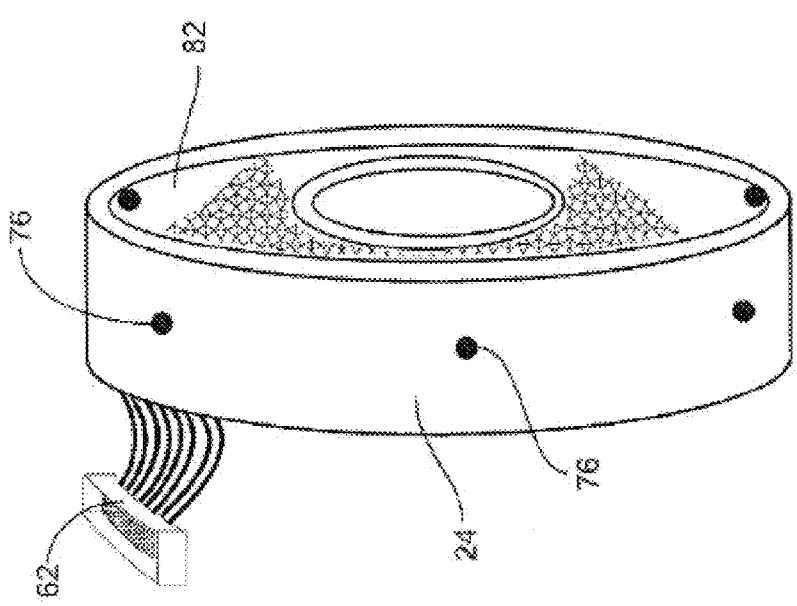

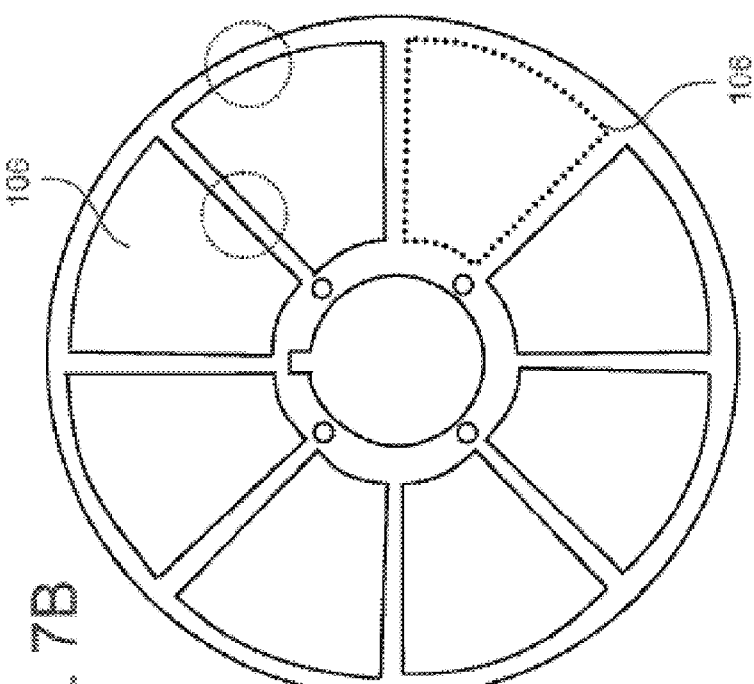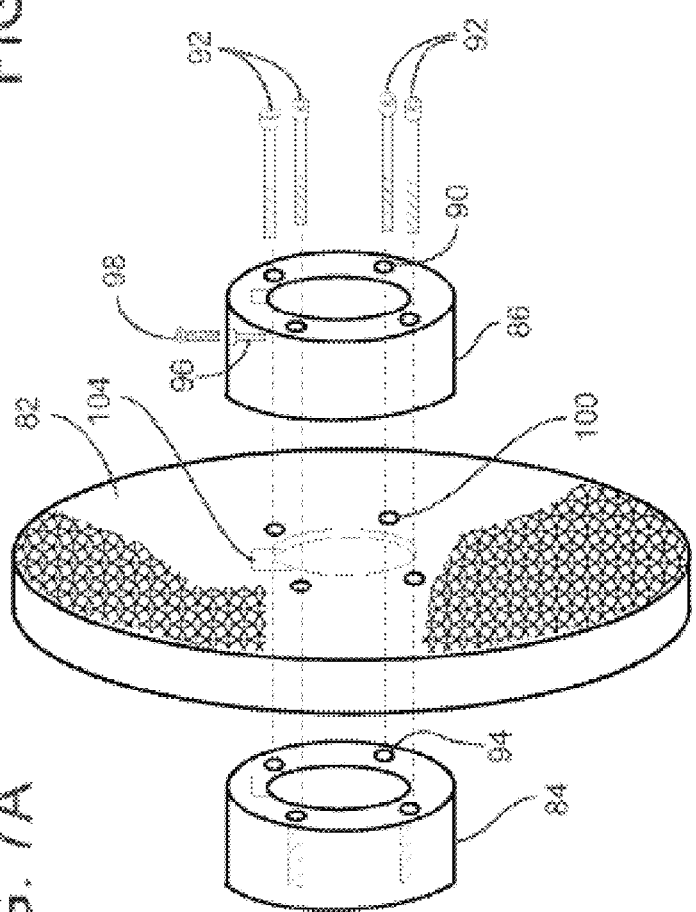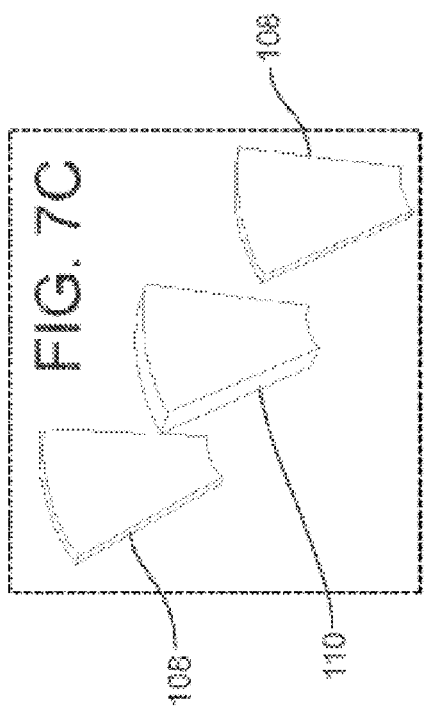

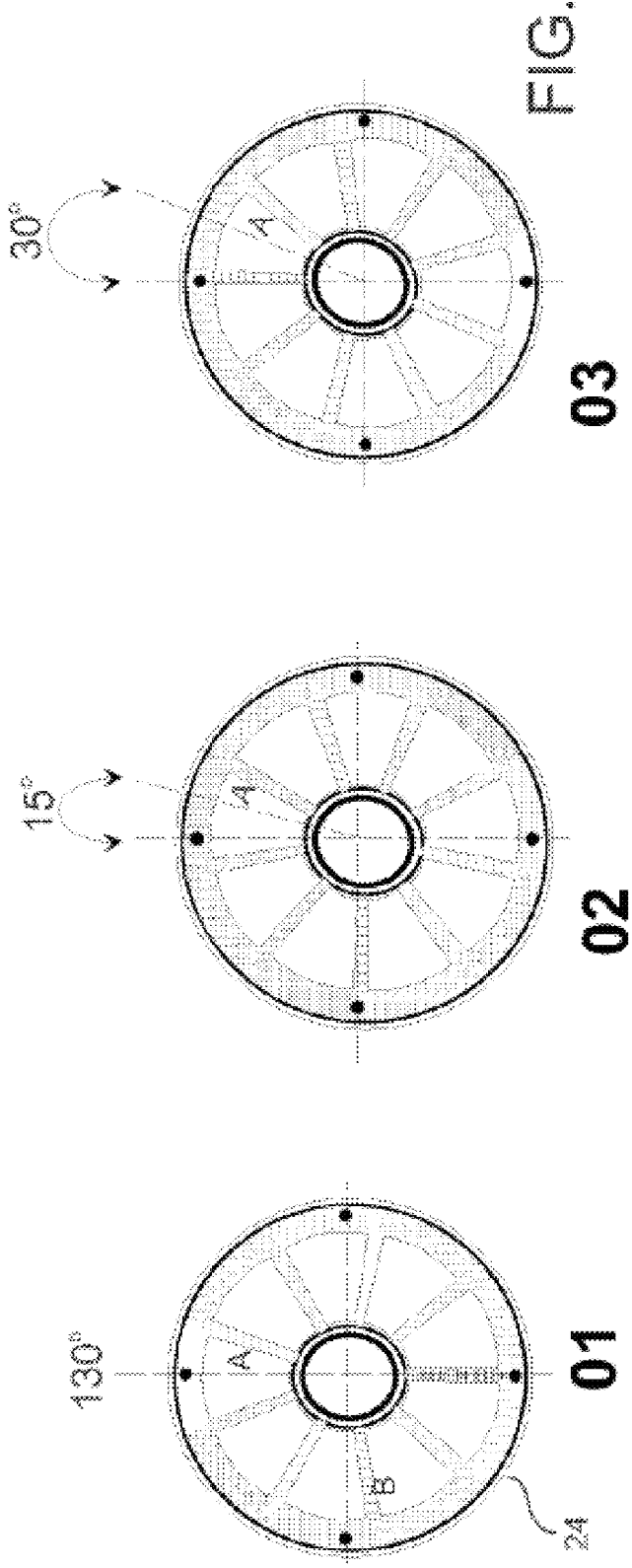
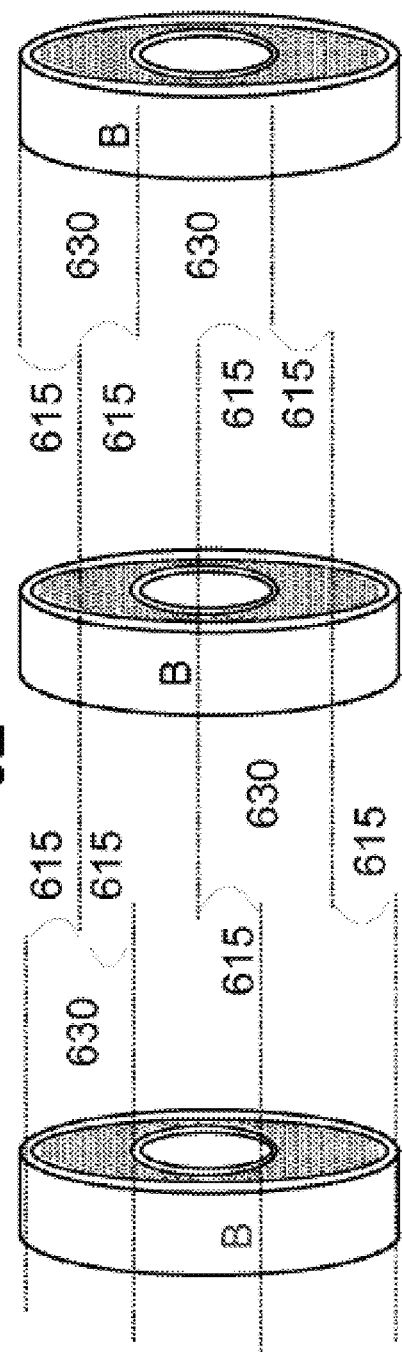

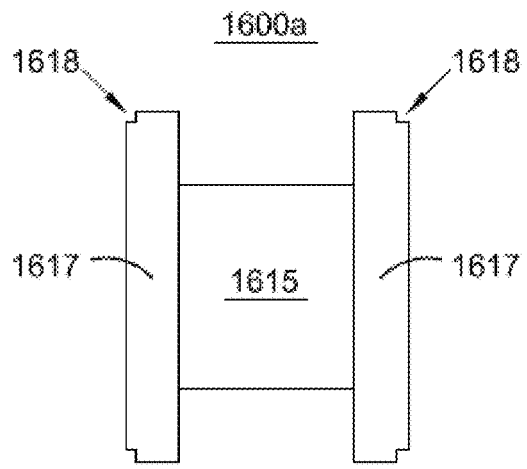
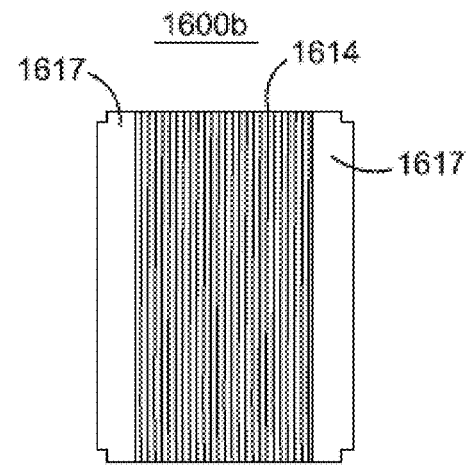
FIG. 16A          FIG. 16B
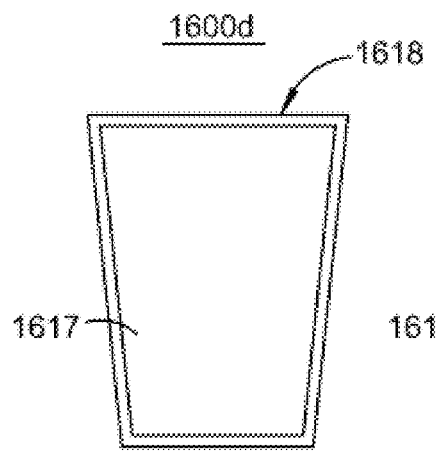
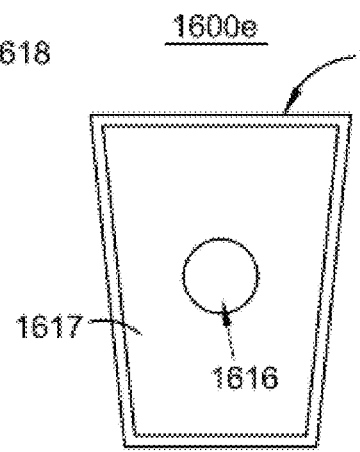
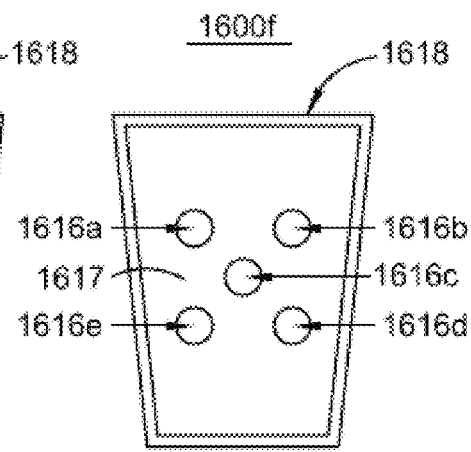
FIG. 16D          FIG. 16E          FIG. 16F

AXIAL MOTOR/GENERATOR HAVING MULTIPLE INLINE STATORS AND ROTORS WITH STACKED/LAYERED PERMANENT MAGNETS, COILS, AND A CONTROLLER

CROSS REFERENCE TO RELATED APPLICATIONS

This application is a continuation-in-part of U.S. patent application Ser. No. 14/448,445, filed Jul. 31, 2014, which claims the benefit of Provisional Application No. 61/980,182, filed Apr. 16, 2014, all of which are hereby incorporated by reference as if fully set forth herein.

FIELD OF INVENTION

The present invention relates generally to an electrical motor and electrical power generation device, and more particularly relates to an electrical motor and electrical power generation device with increased efficiency and productivity.

BACKGROUND OF THE INVENTION

The present invention is directed to an electric motor or electric generator that efficiently stores electric energy and also the effectively accumulates kinetic energy, such as that produced by wind, water, or man-made physical mass. The present invention allows each individual coil or winding (or group thereof) of the electric motor or electrical generator to be treated as an individual entity which allows for instant switching between power regeneration or mechanical power production. This invention complies with new electric grid demands such as 'time of use rates' with the ability to operate efficiently as a mechanical device from stored electrical energy, allowing the invention to operate off grid for extended periods of time.

Current energy shortfalls demand a method to equalize demands between peak usage times and off peak production. Since most electric producers have no ability to efficiently store this electrical energy, an efficient platform for the consumer is needed that is solved by the present invention. The electrical motor and electrical generator disclosed herein assists in electrical power equalization or distribution, making electric energy more profitable for the producer as well as more affordable for the consumer with waste being eliminated from the profit and loss bottom line.

BRIEF SUMMARY OF THE INVENTION

The current invention embodies the dual function of mechanical power production and the ability to produce and collect electrical power simultaneously. By embodying each coil/winding as a separate entity or separate group, each then has the ability to be monitored and controlled by a preprogrammed motor controller module, (PLC) or software enabling this invention to be controlled from the typical computer. Each coil/winding or group thereof then can managed and commanded to either collect electrical power or to produce mechanical power through improved repulsion and or attraction of the magnet assemblies disposed at the perimeter of the multiple vertical rotors and stator assemblies. The ability to manage each coil or winding dictates a wide range of available mechanical power as well as a wide range of collectable electric power giving the unique property and ability to recharge and or replenish the power source when operating at levels of demand less than full power.

The control module being critical for efficient operation under varying load demands requires a high speed PC, PLC or microprocessor to manage input and output signals and to switch between required duties. Input signals are derived from Hall Effect or optical sensors disposed internally or an equivalent form of a rotary encoder which may be physically attached to an extended tail shaft. These input signals are designed to work in conjunction with a wide array of outside sensors including but not limited to speed sensors, RPM sensors, grade ascension and dissention sensors. This invention requires, in its complete design, a PC or PLC capable of managing multiple directions switches that direct current flow between mechanical power production and electrical power production. Varying degrees of complexity for the motor control design is dependent upon the required duties of the motor/generators intended purpose. For more complex control a preprogrammed series of algorithms are written in software form, installed into and executed by the PLC or PC. Differing from the typical electric motor in which pulse width modulation is used to control speed and load, pulse width modulation is primarily used to soften the initial startup of the motor/generator after which the PC or PLC uses switching between mechanical and electrical power production thereafter to manage the load requirements as demanded.

This current invention differs from the typical electric motor in which the stator windings and the rotor are designed to be parallel with the motor shaft and affixed to the housing. In this invention the rotors (multiple) and stators assemblies are disposed at a ninety degree dimension from the motor shaft and housing. This vertical circumference of the rotor and its disposed magnet assemblies along with the stator assemblies create a greater surface tension area which enhances its overall power density footprint. This design allows for all magnetic flux to be directed in a manor where it is always compressed which eliminates flux leakage to the perimeter. The circumference dimension of the rotor and stator and all disposed parts can easily be engineered to be manufactured with varying widths and with larger or smaller circumference dimensions which lends to its versatility of design for specific duties. These vertical rotor and stators form a type of flywheel design not found in the typical electric motor. This design of rotor being machined from quality ferrous material allows for additional strength in regards centrifugal forces of the disposed magnet assemblies and its retention by adding material to the perimeter edge of the rotor. This additional material, adding overall strength to the rotor perimeter, allows for safe high revolutions per minute without the disturbance of the air gap between the rotors, its disposed magnet assemblies and stator coil assemblies. This reengineered rotor and stator design in essence creates increased critical usable surface areas being on the right vertical face and left vertical face (sides) of the multiple rotors which is then utilized in addition to the array of coils/windings in the stator assembly. This array of coils/windings of the stator assemblies operates in the field and proximity of the magnetic flux from the opposing ends of the magnet assemblies disposed in the rotors. All coils and or windings or groups thereof have the ability in conjunction with the control module or motor controller to produce repulsion and or attraction creating mechanical power while retaining the ability and upon demand harvest or collect electrical power. This ability to control each coil/winding or group electronically in essence means that a coil/winding or group thereof can be demanded to produce two or more functions within a single rotation or within determined degrees of rotation of the rotor establishing a new level of efficiency.

BRIEF DESCRIPTION OF THE DRAWINGS

The present invention is illustrated and described herein with reference to the various drawings, in which like reference numbers denote like method steps and/or system components, respectively, and in which:

FIG. 5A is an exploded view of the present invention without the housing.

FIG. 5B is a perspective view of the shaft of the present invention.

FIG. 6A perspective view of an assembled stator assembly.

FIG. 6B is a front view of the stator assembly.

FIG. 6C is an exploded view of the magnet assembly.

FIG. 7A is an exploded view of the rotor assembly.

FIG. 7B is a front view of the rotor assembly.

FIG. 7C is a perspective view of a magnet assembly.

FIG. 10A is a stator face view and degrees of alignment change between stator assemblies.

FIG. 10B is a perspective view of the stators and similar degrees of alignment change between stator assemblies.

FIGS. 16A-F illustrate embodiments of an isolated coil assembly in accordance with various aspects as described herein. FIGS. 16A-B show a top view of an isolated coil assembly with and without one or more wound wires. FIGS. 16D-F show side views of isolated coil assemblies with and without one or more openings longitudinally disposed through the coil assembly. FIG. 16C shows a perspective view of an isolated coil assembly without one or more wound wires.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
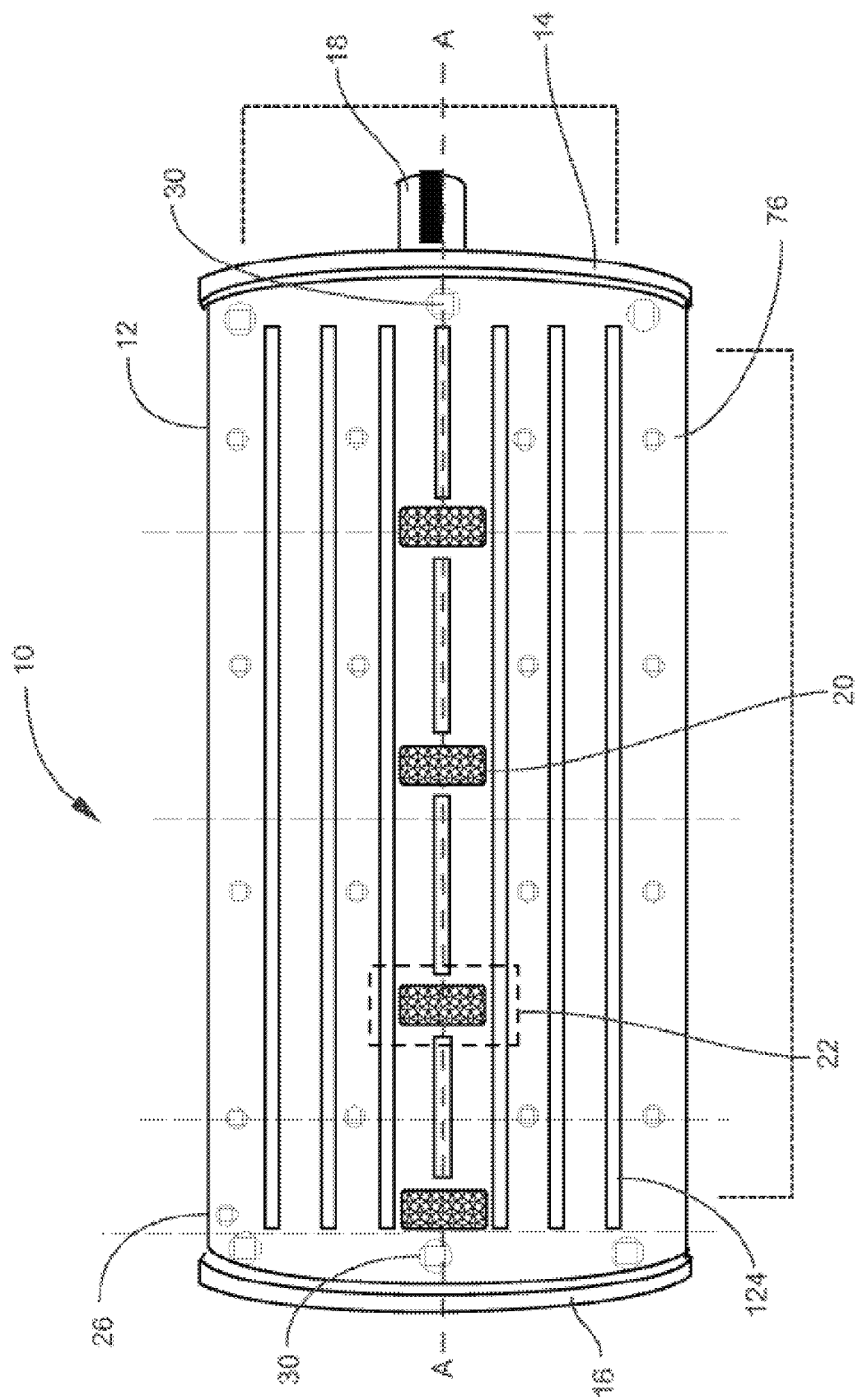
FIG. 1 is a perspective view of the present invention.

Referring now specifically to the drawings, an improved electrical motor or electrical generator device is illustrated in FIG. 1 and is shown generally at reference numeral 10. The device 10 comprises a housing 12, a front end cap 14, a rear end cap 16, and a shaft 18 rotationally engaged to the front end cap 14 and rear end cap 16. The housing 12 has a front end, rear end, interior surface, and exterior surface. The front end cap 14 and rear end cap 16 have an interior side and exterior side. The shaft 18 has a first end and a second end. The first end of the shaft 18 is rotationally engaged to the interior side of the rear end cap 16, and the second end of the shaft 18 protrudes through the front end cap 14 from the interior side to the exterior side.

The housing 12 of the device 10 may be a finely machined metallic structure of preferably a cylindrical design that allows the device 10 to withstand the centrifugal and torsion forces exerted by the internal components of the device 10. Stator openings 20 are disposed on the housing 12 and extend from the exterior side to the interior side of the housing 12. Stator assembly electrical connectors 22 are positioned within the stator openings 20 and may be configured to fit between the stator assembly 24 disposed within the housing 12. A sensor opening is disposed on the housing 12 and extends from the exterior side to the interior side for engaging a Hall Effect sensor plate 28 to the housing 12. A plurality of bores 30 are disposed in close proximity to the front end and rear end of the housing 12 for assisting with the engagement of the front end cap 14 and rear end cap 16 to the housing 12. A corresponding bore 30 is disposed on the front end cap 14 and rear end cap 16, whereby the bore 30 on the housing 12 sits overtop the bore 30 of the respective end cap 14, 16 for receiving an attachment means 40. A plurality of bores 32 are spaced along the housing 12 for assisting with engaging the stator assembly 24 to the housing 12.

Figure 2:
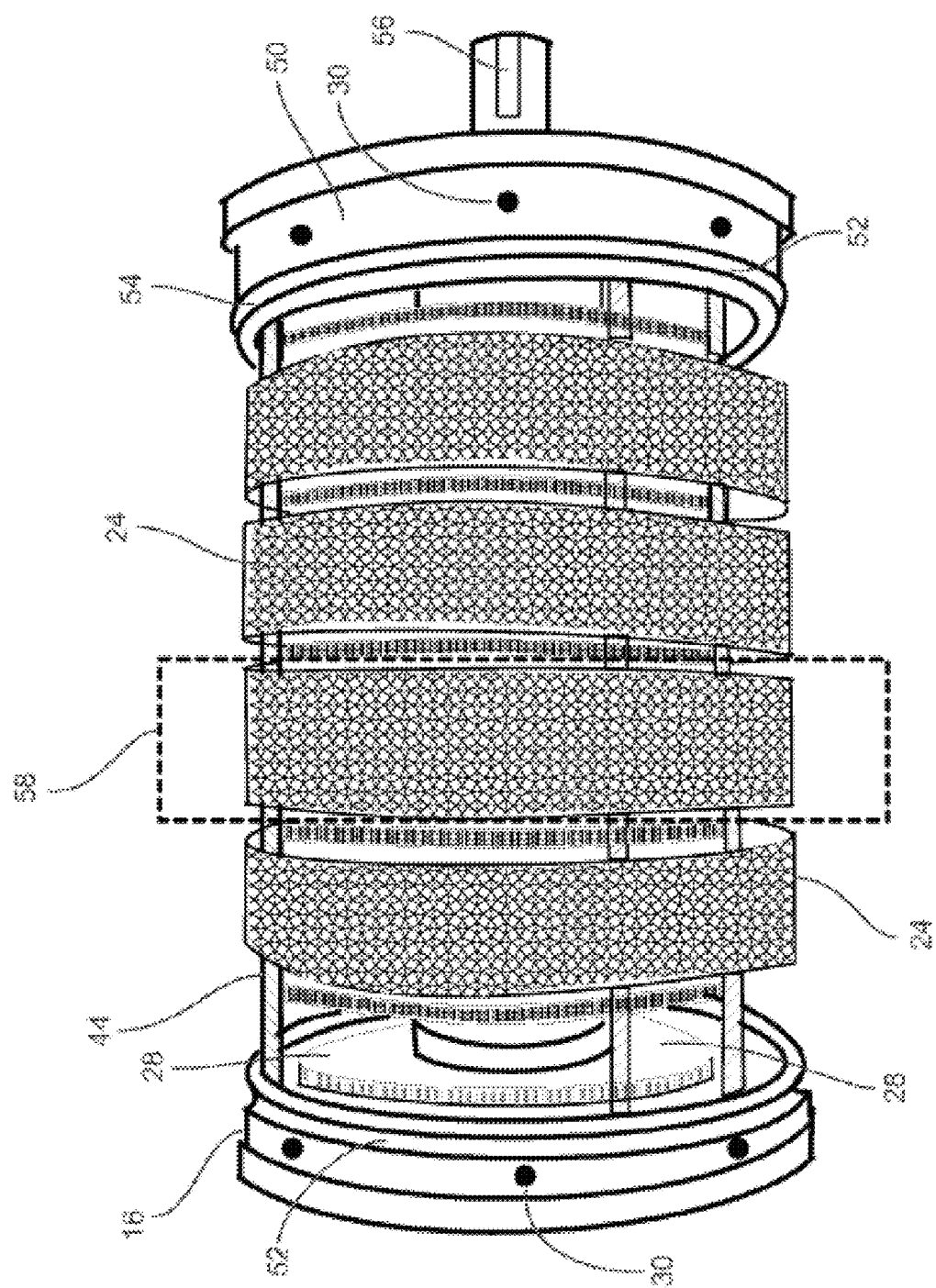
FIG. 2 is a perspective view of the present invention with the housing and electrical connections removed.
Figure 8B:
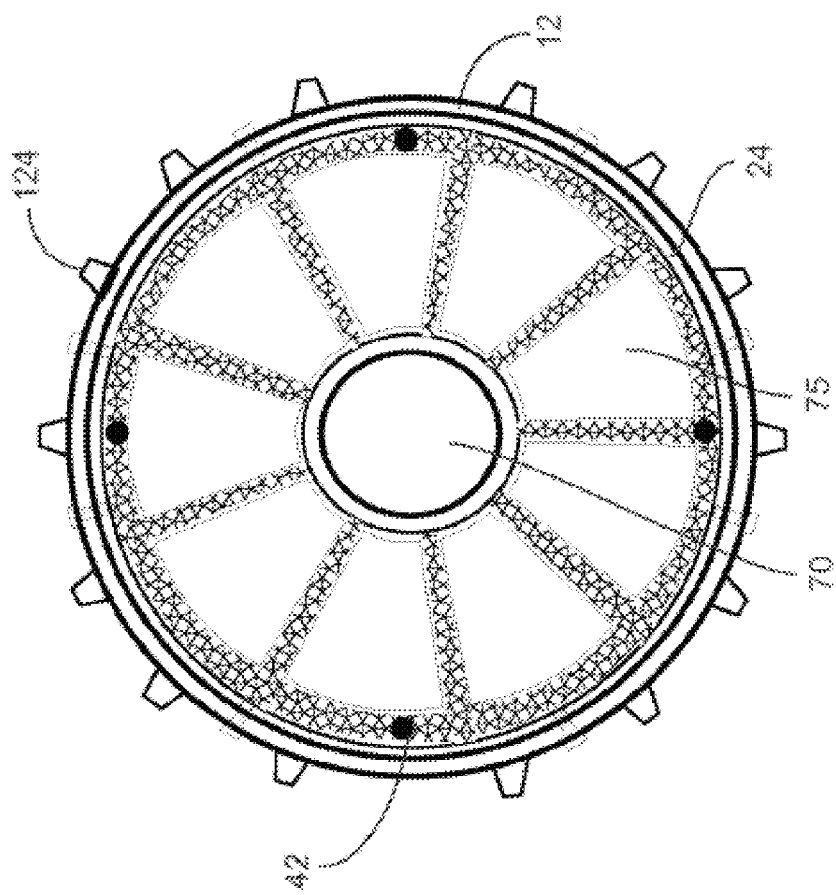
FIG. 8B is a sectional view detailing a singular mounting method of the housing to the motor/generator stator assembly.
Figure 8A:
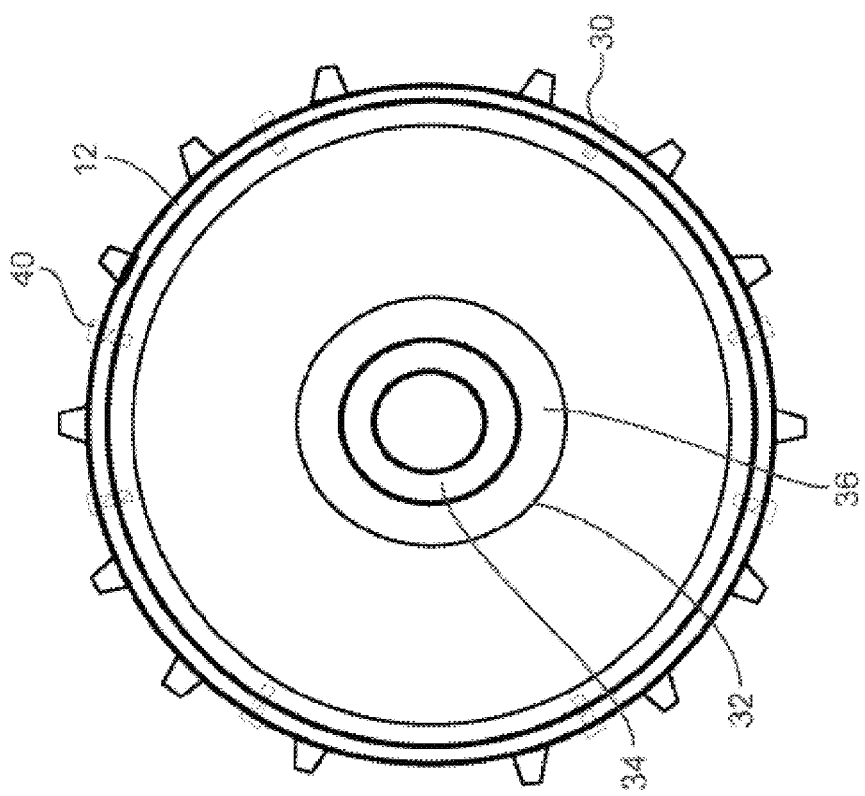
FIG. 8A is a sectional view detailing a singular mounting method of the housing to the motor/generator end caps.

As illustrated in FIGS. 2 and 8A, the front end cap 14 and rear end cap 16 is preferably machined from metallic material capable of withstanding the device's 10 generated torsion and torque forces. The rear end cap 16 contains a seat 32 for receiving a main bearing 34 and bearing seal 36. The seat 32 of the rear end cap 16 is positioned on the center of the interior side, or alternatively in close proximity to the center portion of the interior side of the rear end cap 16. The front end cap 14 contains a front end cap bore 38 that extends from the interior side to the exterior side and allows the shaft 18 to extend through the front end cap 14, as shown in FIG. 5. The front end cap bore 38 receives a main bearing 34 and main bearing seal 36, allowing the shaft 18 to be in rotational arrangement with the front end cap 14.

Figure 3:
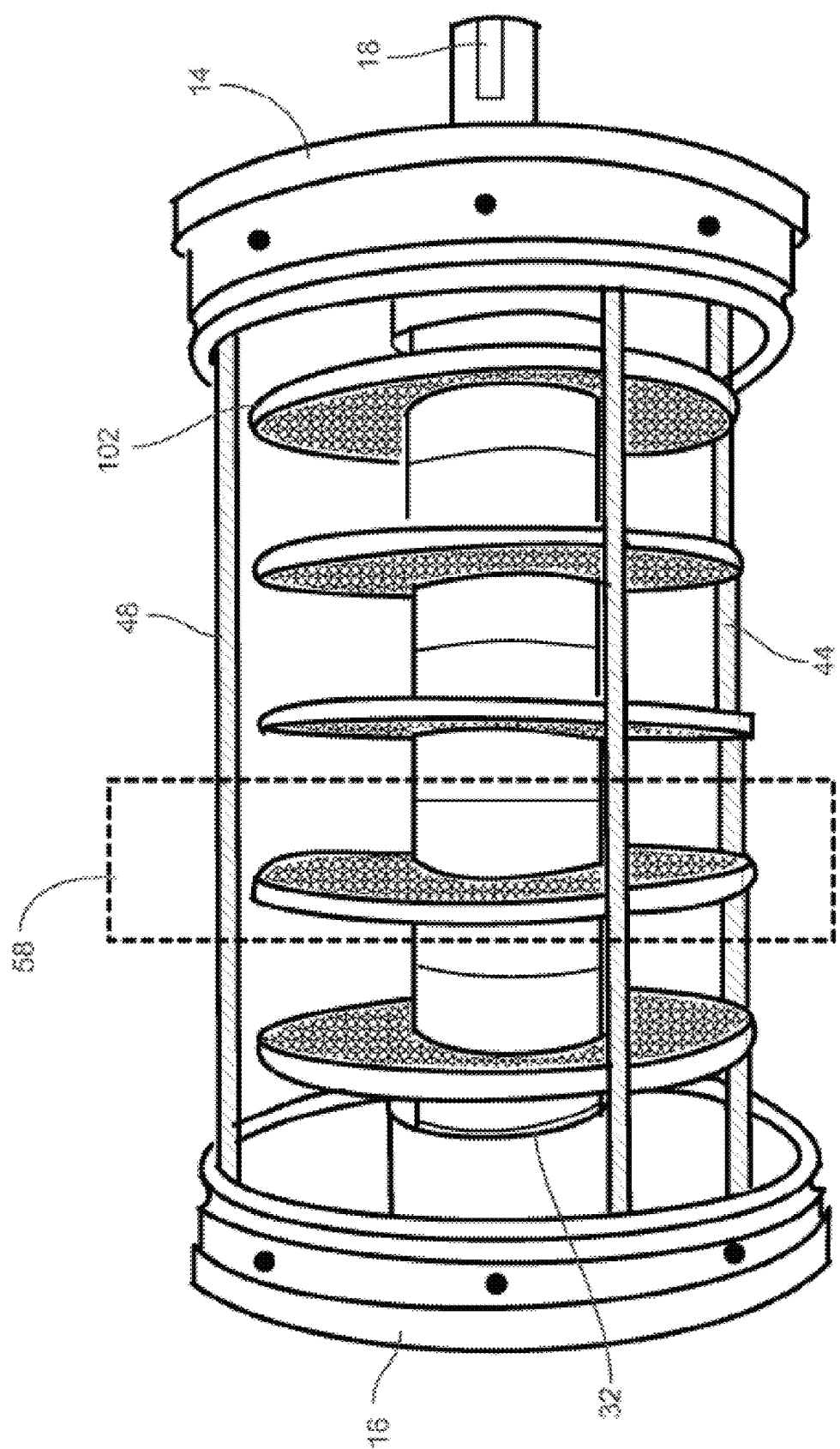
FIG. 3 is a perspective side view of the present invention with the housing, electrical connections and stator assemblies removed showing the disposed rotor parts.
Figure 4:
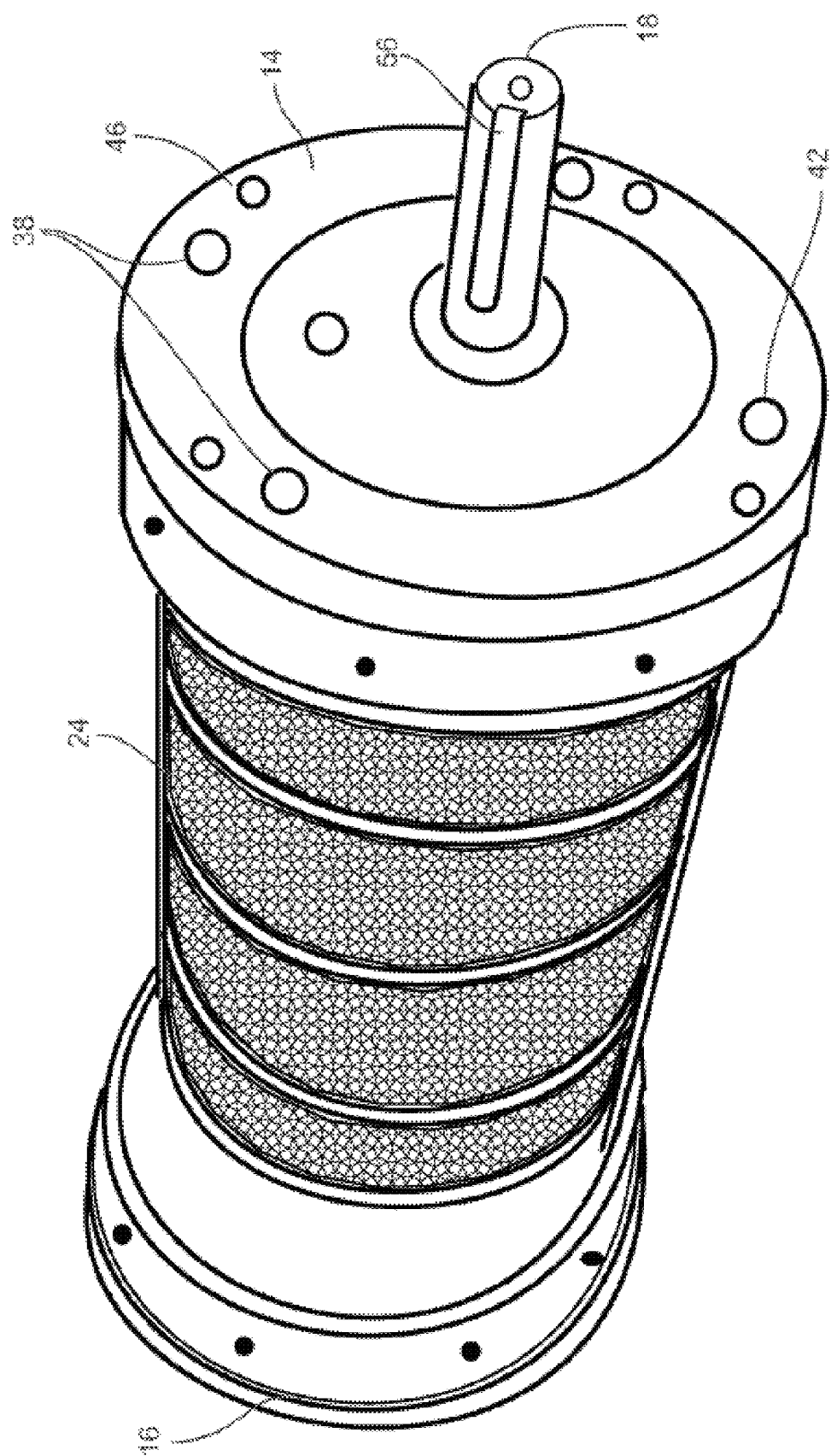
FIG. 4 is a perspective view of the present invention with the housing, electrical connections and stator assemblies removed to expose the assembled disposed rotor parts and face of end cap.

At least one threaded opening 42 is disposed on the interior side of the front end cap 14 and the exterior side of the rear end cap 16, as illustrated in FIGS. 4 and 8B. A correspondingly threaded rod 44, as shown in FIG. 3, having a first end and a second end, is received within and selectively secured to the threaded openings 42. The first end of the threaded rod 44 is received and selectively secured to the threaded opening 42 disposed on the interior side of the rear end cap 16. The second end of the threaded rod 44 is received and selectively secured to the threaded opening 42 disposed on the interior side of the front end cap 14. The end caps 14, 16 additionally may contain threaded bores 46 for receiving correspondingly threaded compression rods 48, having a first end and a second end. These threaded compression rods 48 are multi-functional by serving to compress the end caps 14, 16 tightly to the housing 12, and also to serve to position the stator assemblies 24 sensor plate assembly 28. The first end of the threaded compression rod 48 is received within and selectively secured to the threaded bore 46 on the interior side of the rear end cap 16. The second end of the threaded compression rod 48 is received within and selectively secured to the threaded bore 46 on the interior side of the front end cap 14.

The front end cap 14 and rear end cap 16 contain an annular side 50 with a distal end and a proximal end. An annular channel 52 is disposed on the distal end of the annular side 50 of the front end cap 14 and rear end cap 16, as shown in FIG. 2. Seals manufactured from flexible rubber, such as an O-ring 54 or the like, are positioned within the annular channel 52. The shaft 18 may include a keyway 56 on the second end. In another embodiment, the second end may contain a splined end.

As illustrated in FIG. 3, the device 10 includes at least one rotor 58. A five (5) rotor 58 design is shown with each rotor 58 disposed in a spaced-apart relationship along the length of the shaft 18 of the device. A notch 60 may be formed within the shaft 18 for receiving the center portion of the rotor 58 and retaining the rotor 58 on the shaft 18. The rotor 58 is positioned on the shaft 18 and between the front end cap 14 and rear end cap 16. The compression rod 48 spans between the front end cap 14 and rear end cap 16 spaced-apart from the rotor 58 and providing enough clearance that the compression rod 48 does not contact the rotor 58.

The second end of the shaft 18 may contain a keyway 56, as shown in FIGS. 1-4. The keyway 56 is a channel formed within the second end of the shaft 18 that begins at a point on the external surface of the shaft 18 and extends to the end of the shaft 18. The depth, width, and length of the keyway 56 may have varying dimensions bases upon the uses of the user. As shown in FIGS. 1, 4, and 8A, a plurality of bores 30 are disposed in close proximity to the front end and rear end of the housing 12 for assisting with the engagement of the front end cap 14 and rear end cap 16 to the housing 12. A corresponding bore 30 is disposed on the front end cap 14 and rear end cap 16, whereby the bore 30 on the housing 12 sits overtop the bore 30 of the respective end cap 14, 16 for receiving an attachment means 40. As illustrated in FIG. 8A, the attachment means 40 is a bolt, but the attachment means 40 may also be a screw, fastener, or the like.

FIG. 4 shows a front facial view of the front end cap 14 with indications of machined threaded openings 38 into the front end caps 14. Identical machined threaded opening 38 are disposed on the rear end cap 16. These machined openings 38 serve as a fastening method to assist in end cap 14, 16 removal for maintenance and for assembly of the device 10.

FIG. 5A is an exploded view of a two stator/three rotor design of the device 10. Preferably the shaft 18, which center line is illustrated as A-A, may be constructed and machined from a non-ferrous stainless steel material for the purpose of isolating the magnetic flux to area of the rotor 58. Larger designs and applications may require a machined spline design capable of handling the torsion and centrifugal forces applied. The rotors 58 are disposed upon the shaft 18 and secured in place with the main bearings 34 and 'C' type retaining ring 64. The stators 24 are disposed and secured in the correct horizontal location by locking nuts 66 that fit securely on the threaded compression rods 48. The stator electrical connectors 22 are disposed into the stator openings 20 prepared in the housing 12. As illustrated in FIG. 5B, the bearing seat 32 is depicted which uses a disposed 'C' type retaining ring to lock the bearing 34 into a stationary location on the shaft 18.

The main bearings 34 are disposed into machined seat 32 of both the front end cap 14 and rear end cap 16 and are of a type which will maintain stability through the axial and rotation forces exhorted and are a sealed pre-lubricated type. Bearing speed/RPM rating is dependent upon motor demand and application design but is deemed critical to the motor/generator operation and durability. The seat 32, main bearing 34, and main bearing seal 36 of the front end cap 14 are illustrated in FIG. 8A.

Figure 9:
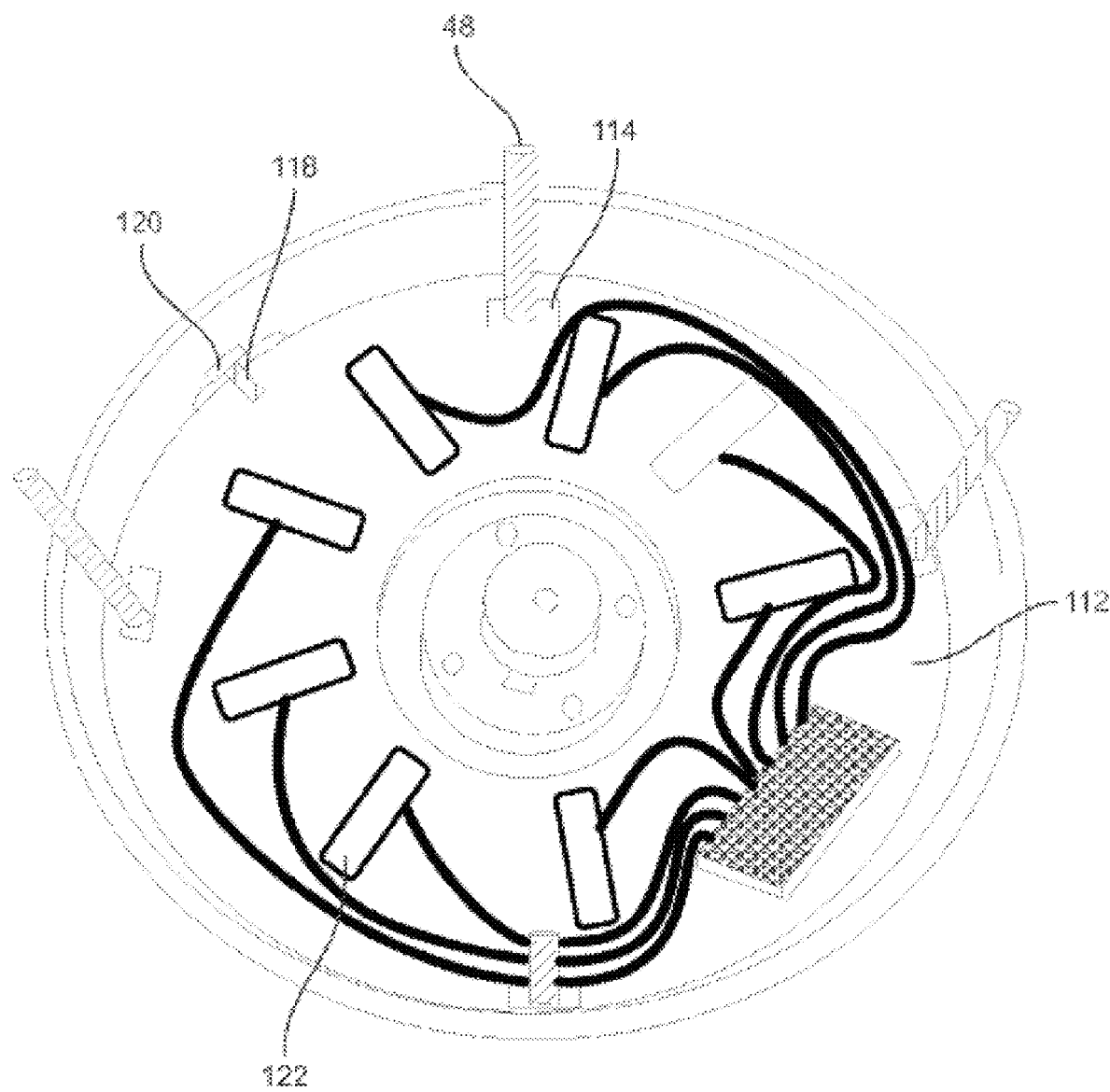
FIG. 9 is a perspective view of a Hall Effect sensor assembly.

FIG. 9 illustrates the Hall Effect sensor assembly 28 disposed and secured in a horizontal location by locking nuts that fit securely on the threaded compression rods 48. An electrical connecting device 62 fits securely into a machined opening into the rear end cap 16. The rotor 58 is disposed upon the shaft 18 and secured in place in conjunction with the bearings and 'C' type retaining ring in that this disposed assembly acts as a singular mechanical device. Further references to the rotor assembly are depicted in FIG. 07 with details depicted in FIG. 07A and FIG. 07B. Stator 24 are disposed and secured in the correct horizontal location by locking nuts that fit securely on the threaded compression rods 48.

A stator 24 is illustrated in FIG. 6A and the face of the stator 24 is illustrated in FIG. 6B. A center hub 68 is disposed with a centrally located opening 70 of the stator 24. The hub 68 may be finely machined from non-ferrous material being aluminum or stainless steel for the purpose of magnetic flux isolation. The hub 68 is hollow and generally circular with an externally, central recessed portion and a raised rim on either side of the hub 68. The raised rim on either side of the hub 68 assist with positioning and retaining the stator 24 on the hub. The central recessed portion of the hub 68 serves as a structural connection when fully assembled with the centrally located opening 70 of the stator 24 for allowing rotor 58 hubs 72 to be received within the centrally located opening 70 of the stator 24. A bearing may be disposed on the central recessed portion of the hub 68. An outer control ring 74 of the stator 24 preferably is finely machined from aluminum in a generally circular design with retention openings 76 being prepared tapped and threaded openings to accept attachment means for securing the stator 24 to the housing 12. Corresponding threaded retention openings 76 are disposed on the housing 12 and extend from the external surface to the internal surface and are positioned over top of the retention openings 76 of the outer control ring 74. This control ring 74 is to set the outside perimeter of the stator 24 but also serves as a heat conductor to dissipate heat generated within the coil assembly of the stator 24 through the housing 12.

An individual coil assembly is depicted in FIG. 6C and having outer magnetic plates 78, and a center magnetic structure 80 on which the coil wiring 81 is positioned around. The coil wiring 81 may be dual or compound wound. The outer magnetic plates 78 and center magnetic structure 80 are preferably finely machined and fit within a form and secured by a specialized welding process after which these combined parts are then coated with an appropriate non electrical conductive coating after which the wire winding process can be completed. The outer magnetic plates 78 and center magnetic structure 80 are preferably precision machined from a low carbon steel requiring a dry hydrogen annealing process to obtain the desired permeability rating of 8000 or more. Laminated 'silicon a' steel is an acceptable alternative but levels of performance will diminish to varying degrees depending on the motor/generators application and primary function. The outer control ring 74, hub 68, outer magnetic plates 78, and center magnetic structure 80 are preferably all machined and assembled parts fitted into machined injection mold, held securely in place and all interior electrical connections made to the external electrical connector 22. The threaded bores 46 for receiving the threaded rod 44 and an epoxy 77 may be completed with a carbon fiber exterior covering 82, as shown on FIG. 6A, for additional strength. The epoxy used must have a high thermal conductive rating to disperse heat to the outer control ring 74 and thus to the housing 12 as well as a high structural strength rating.

The stator 24 contains at least one, and preferably a plurality of stator openings 75 for receiving the coil assembly consisting of the coil wiring 81 wound around the outer magnetic plates 78 and center magnetic structure 80. Preferably, the coil wiring 81 is made of copper and the magnetic plates 78, 80 are composed of a high permeability steel, such as that sold under the trade name Vim Var™ from ED Fagan, Inc. The stator openings 75 are generally pie shaped, meaning the first side adjacent the outer control ring 74 is greater in length than the second side, adjacent the center hub 68 and centrally located opening 70. Two opposed sides extend between the first side and second side and are angled inward. The outer magnetic parts 78 have a corresponding shape as the stator openings 75 and are generally pie shaped, meaning the top side has a larger length than the bottom side. Two opposed sides extend between the top side and the bottom side and are angled inward.

The rotor 58 consists of a front hub 84 and rear hub 86 that are precision machined locking hubs constructed from aluminum or other non-ferrous material capable of withstanding the structural stresses to be applied. This locking hubs 84, 86 contain a machined keyway 88 that corresponds with the keyway 56 machined of the shaft 18. Countersunk openings 90 that may be threaded or non-threaded, in the rear locking hub 86 receive retention devices 92. The front locking hub 84 contains openings 94 that can be threaded or non-threaded, for receiving retention devices 92. A tapped, threaded, and countersunk opening 96 is disposed on the rear locking hub 86 for receiving an engagement device 98 which serves to lock the rear locking hub 86, and by way thereof, the rotor 58 to the shaft 18. The rotor 58 contains openings 100 that correspond and are aligned with the openings 94 of the front locking hub 84 and the openings 96 of the rear locking hub 86 and aligned therewith. The retention devices 92 are received within the openings 100 of the rotor 58 and the openings 94 of the front locking hub 84 and the openings 96 in the rear locking hub 86. The retention devices 92 may be a screw, bolt, fastener, or the like.

The circumference of the front locking hub 84 and rear locking hub 86 are less than the diameter of the centrally located opening 70 of the stator 24. The rotor 58 also consists of a preferably finely machined quality steel plate 102 with machined openings 100 for receiving the retention devices 92. The steel plate 102 of the rotor 58 also contains a keyway 104 and magnet assembly openings 106 for accepting magnet assemblies 112. The magnet assemblies comprise two outer magnets 108 and a central magnet 110. Preferably, the outer magnets 108 are of a ceramic type 108 which adds magnetic flux depth while also serving as a type of heat shield and an assembly comprised of NdFeB which supplies the majority of the magnetic flux strength being seventy percent of the combined magnet assembly mass. The central magnet 110 is preferably an NdFeB magnet and is laminated to the outer magnets 108 using a fast setting epoxy and collectively is termed a singular magnet assembly 112. The magnet assembly 112 is received within the magnet assembly openings 106 of the rotor 58. A carbon fiber exterior covering 82 is applied to the face of the steel plate 102 to add structural integrity to the lateral and horizontal forces.

Figure 12:
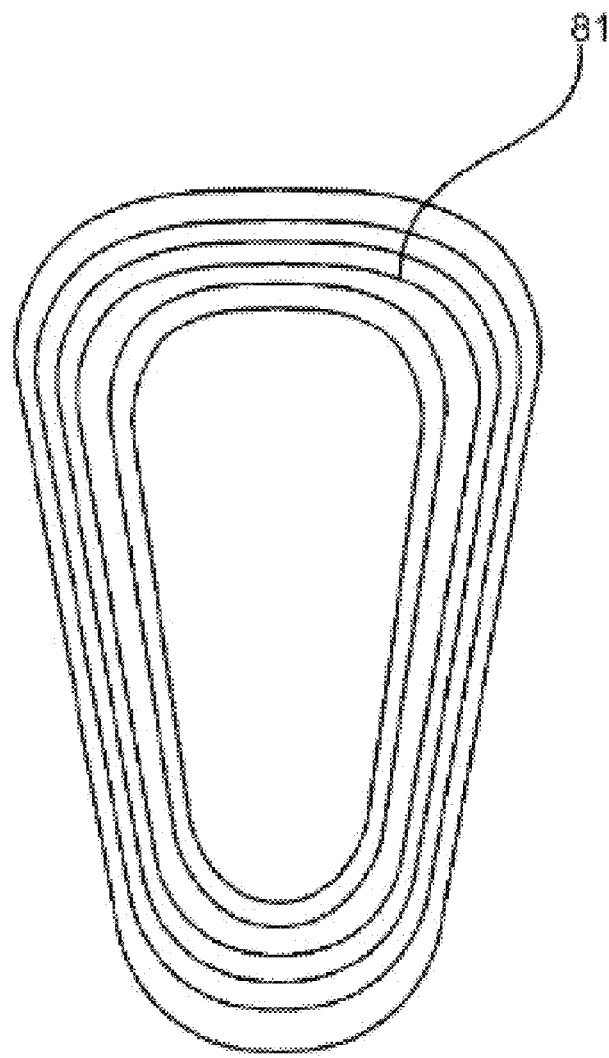
FIG. 12 is an alternative embodiment of a magnet assembly.

The rotor 58 contains at least one, and preferably a plurality of rotor openings 106 for receiving the magnet assembly 112 consisting of two outer magnets 108 and an inner magnet 110. Preferably the central magnet 110 has a larger width than the outer magnets 108. The rotor openings 106 are generally pie shaped, meaning the first side adjacent the exterior of the rotor 58 is greater in length than the second side, adjacent the central opening. Two opposed sides extend between the first side and second side and are angled inward. The outer magnet 108 and central magnet 110 have a corresponding shape as the rotor openings 106 and are generally pie shaped, meaning the top side has a larger length than the bottom side. Two opposed sides extend between the top side and the bottom side and are angled inward. Alternatively, a single NdFeB magnet may be used as illustrated in FIG. 12. As illustrated in FIG. 12, the single NdFeB magnet consisting of coil wiring 81 wound around the magnet.

FIG. 9 illustrates an exemplary embodiment of a Hall Effect sensor assembly 28 of the present invention, which is the communication device to an exterior controller 116. Being one of several options of communication being an optical device or rotary encoder, the Hall Effect sensor assembly 28 operates within cost effectiveness utilizing the magnetic flux from the existing rotor assembly. This view does not assign or restrict the layout or the number of sensors or magnet assemblies for a specific desired communication device. The Hall Effect sensor assembly 28 is positioned on a mounting plate 112 that may be positioned on the compression rods 48. As illustrated in FIG. 9, the mounting plate 112 contains threaded rod openings 114 which the compression rods 48 extend therethrough. As shown, the mounting plate 112 may contain four equally spaced apart rod openings 114 around the exterior of the mounting plate 112. The mounting plate 112 as illustrated is generally circular for placement within the generally circular housing 12 that is fitted and retained in position with the threaded compression rods 48 and the appropriate retaining device, such as a nut or the like, that will secure the mounting plate 112, but still allow for horizontal rotation. The mounting plate 112 fits within tolerances into the housing 12 and is secured to the housing 12 with a set screw 118. A slotted opening 120 within the housing 12 allows for adjustment, such as horizontal adjustment, which will advance or retard the energizing of the coil assemblies for calibrating the device. The set screw 118 fits into a tapped and threaded opening prepared in the mounting plate 112. This ability to adjust the timing of coil energizing is critical when the device 10 is demanded to operate from differing voltage levels as a lower than optimal voltage will require a retarding adjustment and higher voltages will require advancement in the timing adjustment. The Hall Effect sensors 122 of which placement in conjunction with the magnetic flux created by the rotor 58 is critical to communicate correct signals to the controller 116. FIG. 9 shows a front rotor hub 84 and shaft 18 with tolerances that will not obstruct free movement of the mounting plate 112. The Hall Effect sensors 122 are wired and adjoined to a singular connection device 62 which fits into a machined opening prepared in the rear end cap 16. The Hall Effect Sensor may also be an encoder, optical sensor, or like sensor.

Referring next to FIG. 10, wherein depicts a view of a singular design of the stator 24 and its location or rotation in relation to the rotor 58. It is imperative when designing the layout of this type of motor/generator that the primary functions being mechanical power production, electrical power production or an equal combination of both. There are some secondary functions which can be adapted to this motor/generator such as applied braking forces. If the primary demand of the motor/generator is to produce electric power or when a mechanical power producing platform is desired without the need for braking then the typical odd number of stator coils per assembly will act sufficiently given the layout or design reflects the ability to regenerate electrical power in the industry standard of three phase. This view depicts a design that produces large amounts of braking forces and yet retains the ability to regenerate electrical power in three phases and allows for an equal number of coils per stator 24. With first view being FIG. 10A, depicting a face view and rotations of a stator 24 and second view being FIG. 10B which is a perspective view in relation to the same rotational degrees as depicted in FIG. 10A. First in FIG. 10A the first stator 24 labeled 01 in FIG. 10A depicting a "0" degree mark B-B and magnet assembly 'A' and f refers to top dead center. Referring next to stator assembly 24 "2" in FIG. 10A which depicts a rotation of an offset degree clockwise from "0" and then referring next to stator 24 "3" in FIG. 10A which also depicts a clockwise rotation of an offset degree from "0". This rotation of the stator 24 requires relocation of retention openings 76 disposed on the housing 12 and stator 24. In FIG. 10B a perspective view depicting the same rotation as in FIG. 10A beginning with stator 24 "01" and next depicting magnet assembly 107 "02" and the clockwise offset degree rotation difference 615 from '0' degrees 600 and 630 depicting magnet assembly "03" and the offset degree difference between center line in each stator assembly, including varying degrees based upon the desires of the user.

Figure 11:
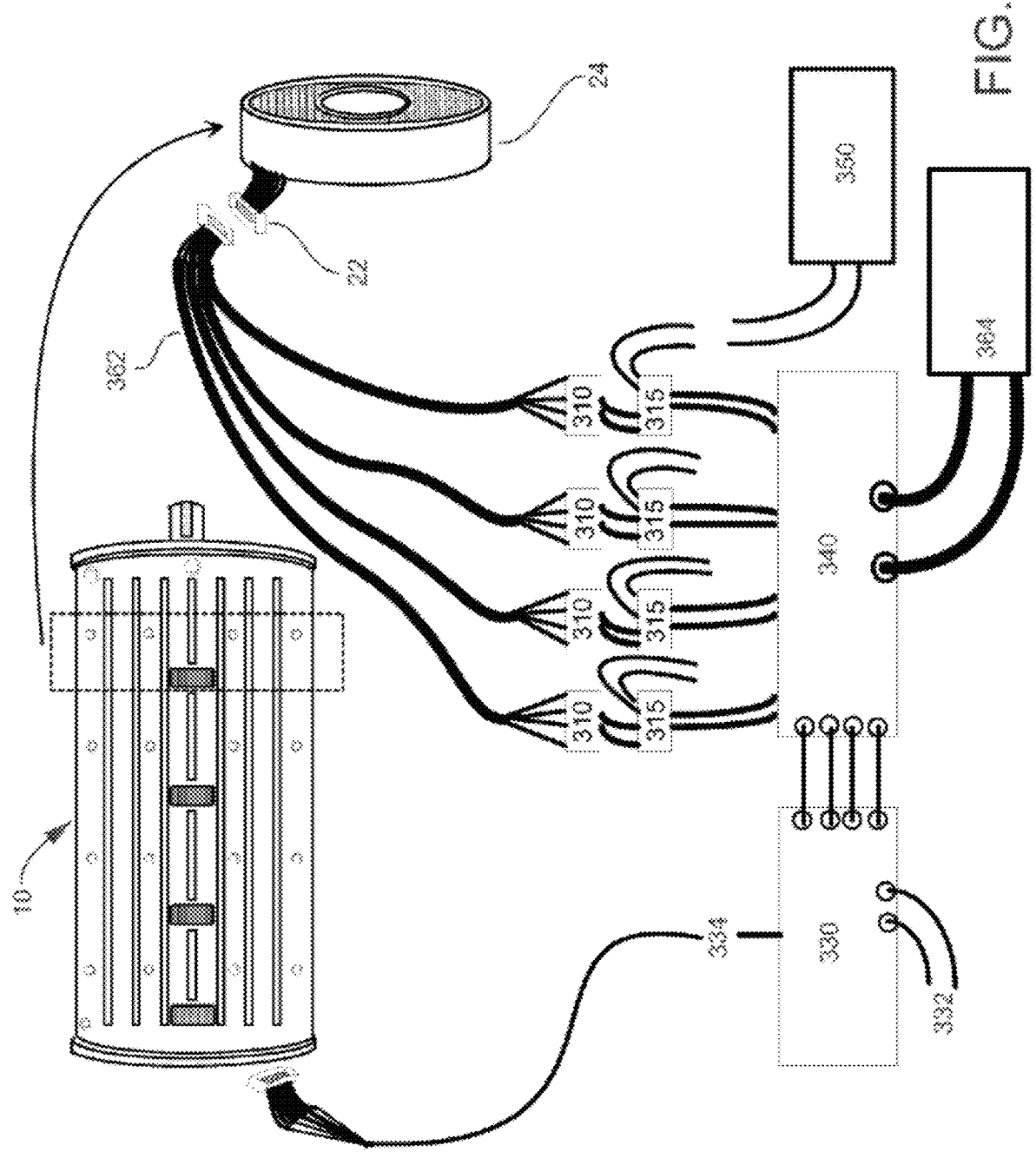
FIG. 11 is a motor control and control panel wiring.

FIG. 11 illustrates an exemplary embodiment of electronic controller 116 of the device 10. FIG. 01 which depicts a four stator/five rotor design of which the stator and rotor have equal (eight) section magnet assembly openings 106 of the rotor 58 and stator openings 75 of the stator 24 per assembly referenced in FIG. 6 and FIG. 7. FIGS. 6 and 7 refer to a singular stator 24 and electrical connections 22 and are wired to a control panel 362. A power supply input 364 is engaged to a high speed switch mechanism 340 which in turn converts the direct current power supply to synchronous alternating current. This high speed switch 340 is controlled and monitored with a PC, high speed PLC or microprocessor 330, here after called the 'processor', that will accept signals from both device positioning sensors 334 and outside sensors 332. The processor 330 also controls first bidirectional switching 315 which switches between two functions. The function of this first bidirectional switch 315 is defined to allow power to be supplied to the device 10 passing through a secondary bidirectional switch 310 or to allow electrical energy produced by the device 10 to flow to a voltage regulator 350 and then to the power supply 364. The function of second bidirectional switch 310 is defined to allow power to flow to the device 10 specifically a coil assembly disposed in the stator 24 by two methods. Each coil assembly in the stator 24 is either dual or compound wound as depicted in FIG. 06, and thus has the ability to accept power either in series or parallel. Each coil assembly receiving electrical power in series combines each winding to act as a singular wound coil and thus produce mechanical power in relation to the device 10 extended run time. Each coil assembly when receiving power in parallel allows each of the two coil windings to act as individual coils thus producing considerable more mechanical power but only for predetermined run time. Coil saturation will become evident if this run time is extended beyond the saturation point of the coils and heat will then begin to deteriorate the windings. This view dose not assigns or set limitations to complexity of the motor/generator control panel design.

The device 10 as illustrated includes two stators 24 and three rotors 58. However, the device may include any number of rotors 58 and stators 24 and in any combination.

The device 10 as illustrated in FIGS. 1, 8A, and 8B may contain fins 124 or slots that serve a cooling function. The fins 124 or slots act as a heat transfer mechanism for dissipating heat from the device 10.

Figure 13:
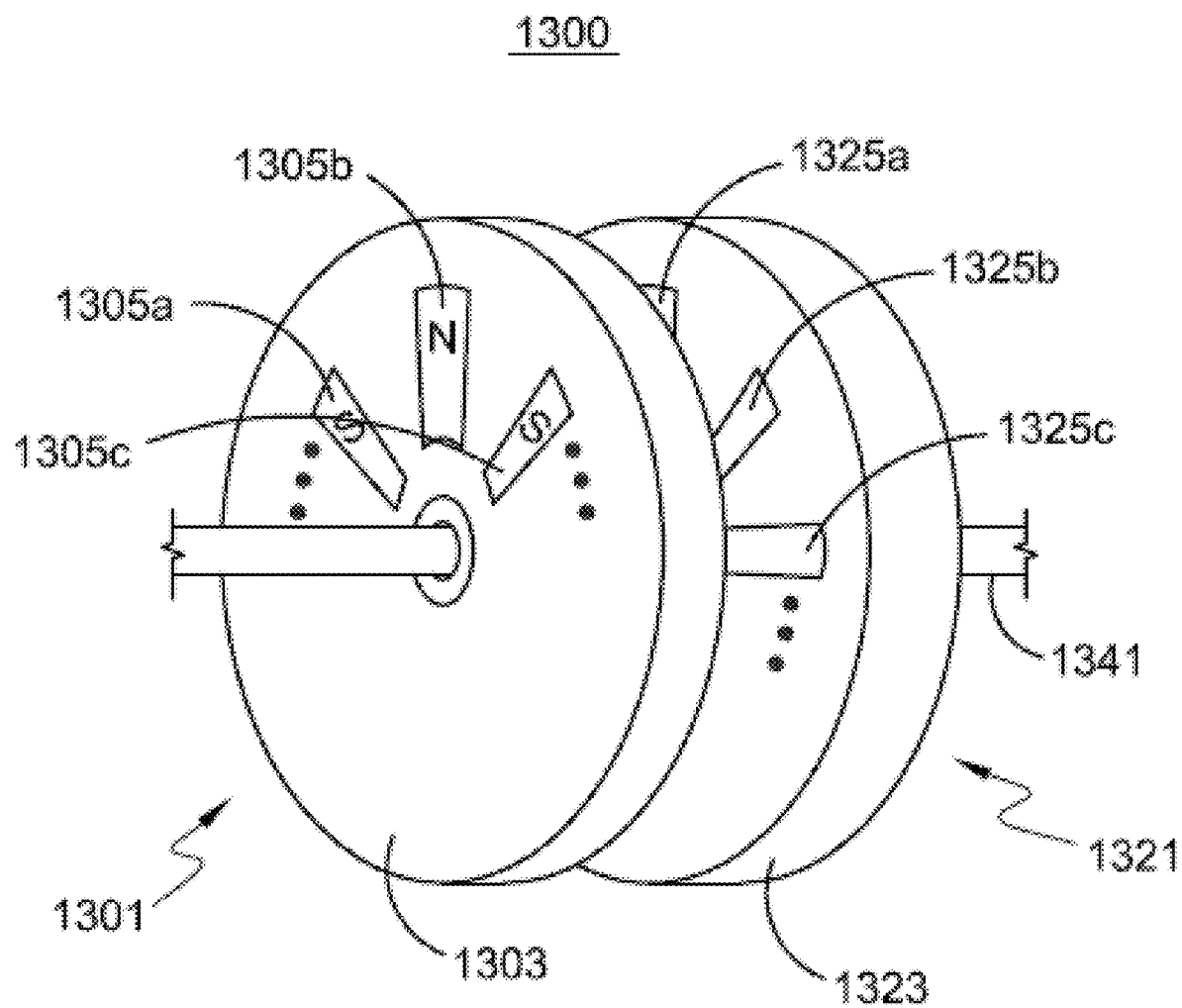
FIG. 13 illustrates one embodiment of a slice assembly in accordance with various aspects as described herein.

FIG. 13 illustrates one embodiment of a slice assembly 1300 in accordance with various aspects as described herein. In FIG. 13, the slice assembly 1300 may include a rotor assembly 1301 and a stator assembly 1321. The rotor assembly 1301 may include a rotor plate 1303 and a set of isolated permanent magnets 1305a-c that are disposed in openings through the rotor plate 1303 about a shaft 1341 that is rotatably coupled to the rotor assembly 1301. The stator assembly 1321 may include a stator plate 1323 and a set of isolated coil assemblies 1325a-c that are disposed in openings through the stator plate 1323 about the shaft 1341. The stator assembly 1321 may be coupled to a housing of the corresponding electric motor/generator. Further, the rotor assembly 1301 may be positioned proximate the stator assembly 1321 so that the respective set of isolated permanent magnets 1305a-c and the set of isolated coil assemblies 1325a-c magnetically interact to rotate the shaft when electric power is supplied to the set of isolated coil assemblies 1325a-c or to generate electric power from the set of isolated coil assemblies 1325a-c when the shaft 1341 is rotated.

Figure 14A:
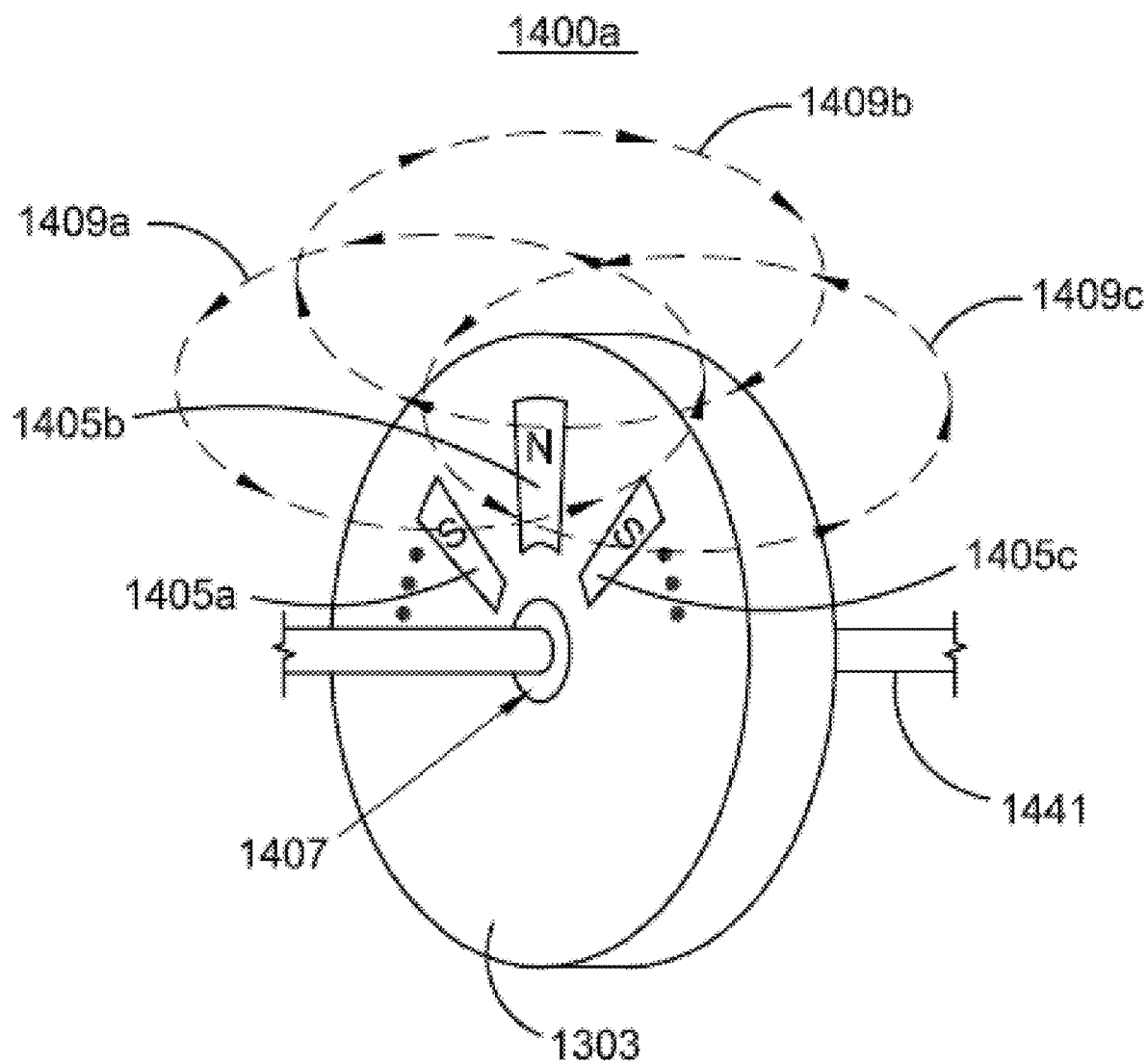
FIGS. 14A-B illustrate another embodiment of a rotor assembly in accordance with various aspects as described herein.
Figure 14B:
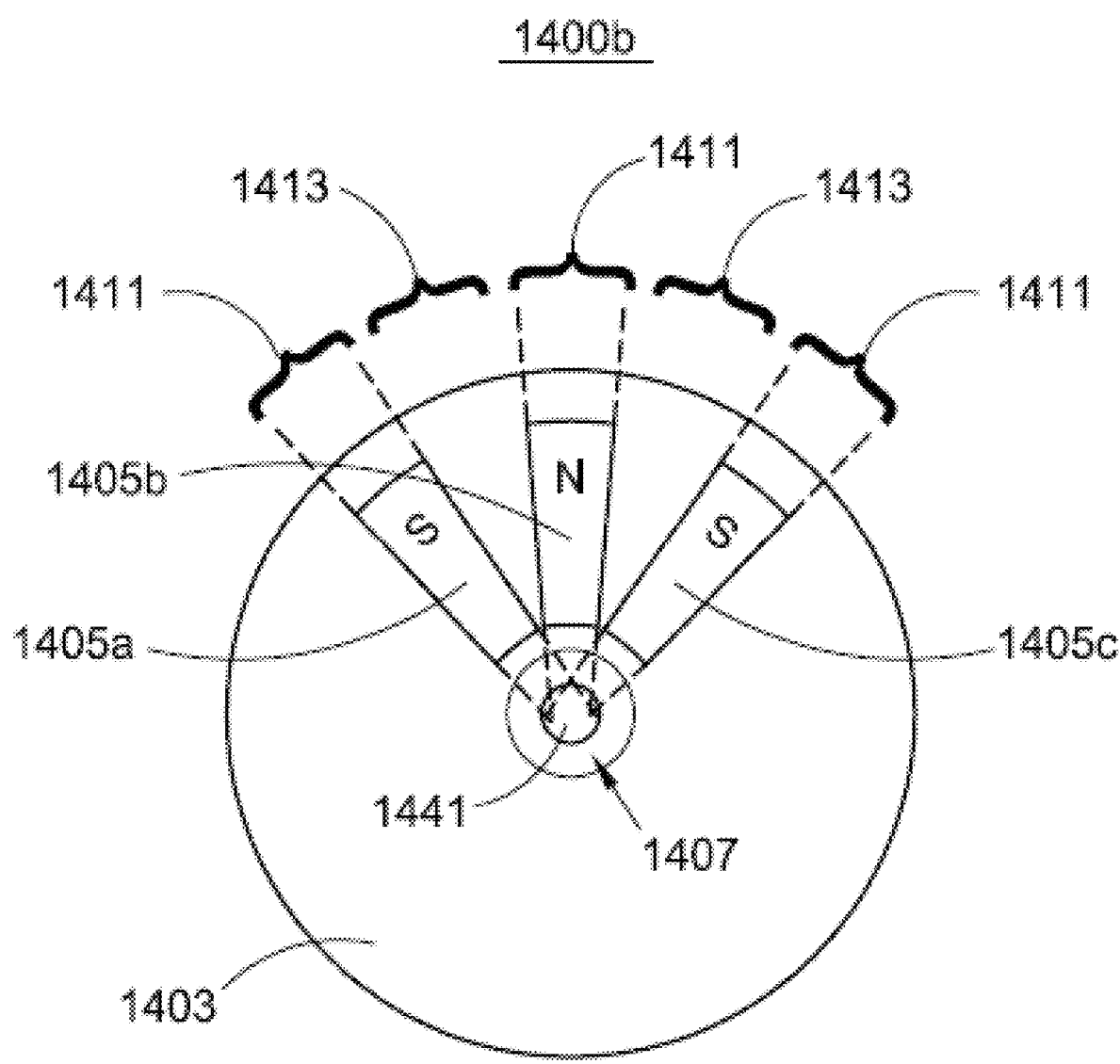

FIGS. 14A-B illustrate another embodiment of a rotor assembly 1400a-b in accordance with various aspects as described herein. In FIG. 14A, the rotor assembly 1400a-b may include a rotor plate 1403, a set of isolated permanent magnets 1405a-c, a centrally located opening 1407, the like, or any combination thereof. The centrally located opening 1407 may be disposed through the rotor plate 1403 and may be operable to receive a shaft 1441 so that the rotor plate 1403 may be rotatably coupled to the shaft 1441. The rotor plate 1403 may include circumferentially distributed equidistant openings through the rotor plate 1403 about the centrally located opening 1407. The set of isolated permanent magnets 1405a-c may be disposed in these equidistant openings. Each permanent magnet 1405a-c may have a magnetization direction co-axial to the shaft. Also, each permanent magnet 1405a-c may have a magnetic flux 1409a-c flowing in an opposite direction to a magnetic flux 1409a-c of each circumferentially adjacent permanent magnet 1405a-c. For example, the permanent magnet 1405b has a magnetic flux 1409b that flows in an opposite direction to the magnetic fluxes 1409a,c of each respective circumferentially adjacent permanent magnet 1409a,c.

In FIG. 14B, each permanent magnet 1405a-c may have the same radial angle 1411. Further, each gap between circumferentially adjacent permanent magnets 1405a-c may have the same radial angle 1413. Accordingly, the permanent magnet radial angle 1411 and the permanent magnet gap radial angle 1413 may be related as follows:

$$\left(\frac{360°}{NumberofPermMagnets}\right) = PermMagnetRadialAngle + PermMagnetGapRadialAngle \quad \text{Equation (1)}$$

Using this relationship, the permanent magnet radial angle 1411 may be determined by:

$$\left(\frac{360°}{NumberOfPermMagnets}\right) - PermMagnetGapRadialAngle \quad \text{Equation (2)}$$

Further, the permanent magnet gap radial angle 1413 may be determined by:

$$\left(\frac{360°}{NumberOfPermMagnets}\right) - PermMagnetRadialAngle \quad \text{Equation (3)}$$

Based on Equations (1)-(3), the sets of isolated permanent magnets 1405a-c of the rotor assembly 1400a-b may have many different configurations such as follows:

| No. of Permanent Magnets | Permanent Magnet Radial Angle | Permanent Magnet Gap Radial Angle |
| --- | --- | --- |
| 4 | 45° | 45° |
| 6 | 30° | 30° |
| 8 | 30° | 15° |
| 10 | 18° | 18° |
| 12 | 20° | 10° |
| 12 | 15° | 15° |

Figure 15A:
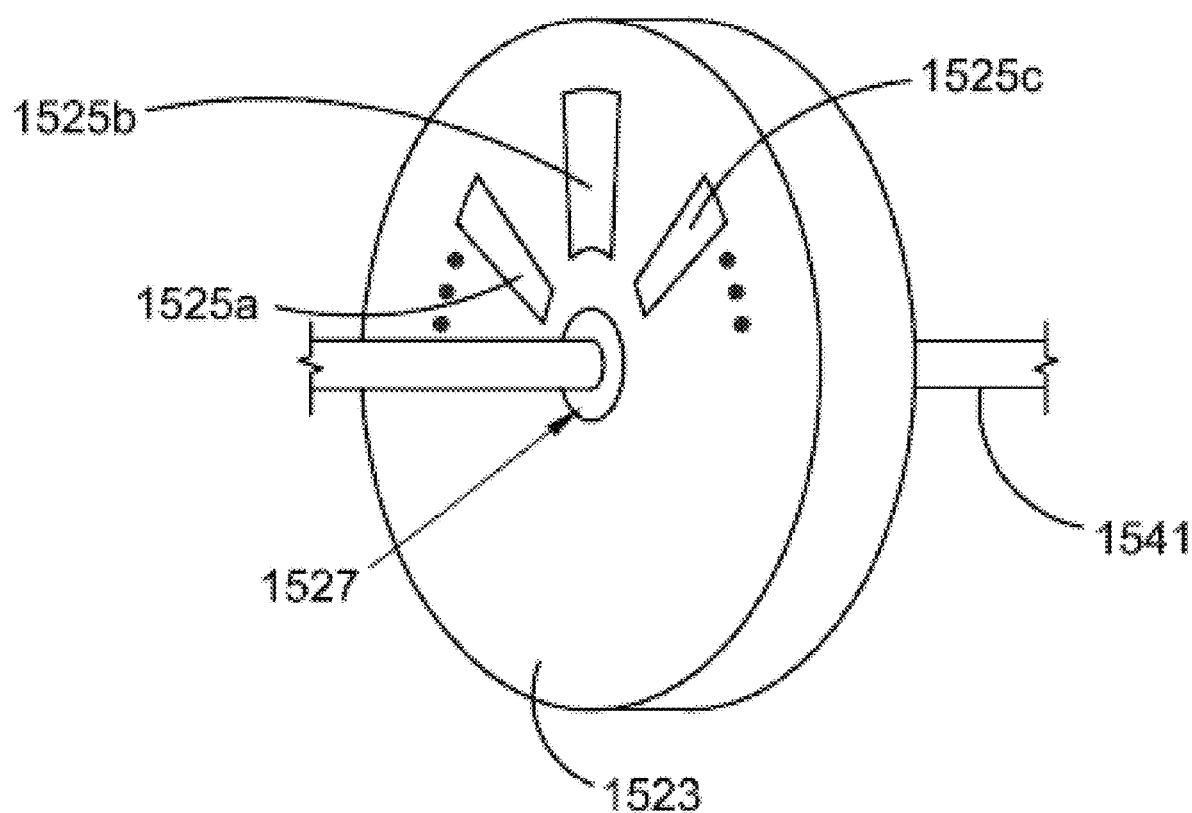
FIGS. 15A-B illustrate another embodiment of a stator assembly in accordance with various aspects as described herein.
Figure 15B:
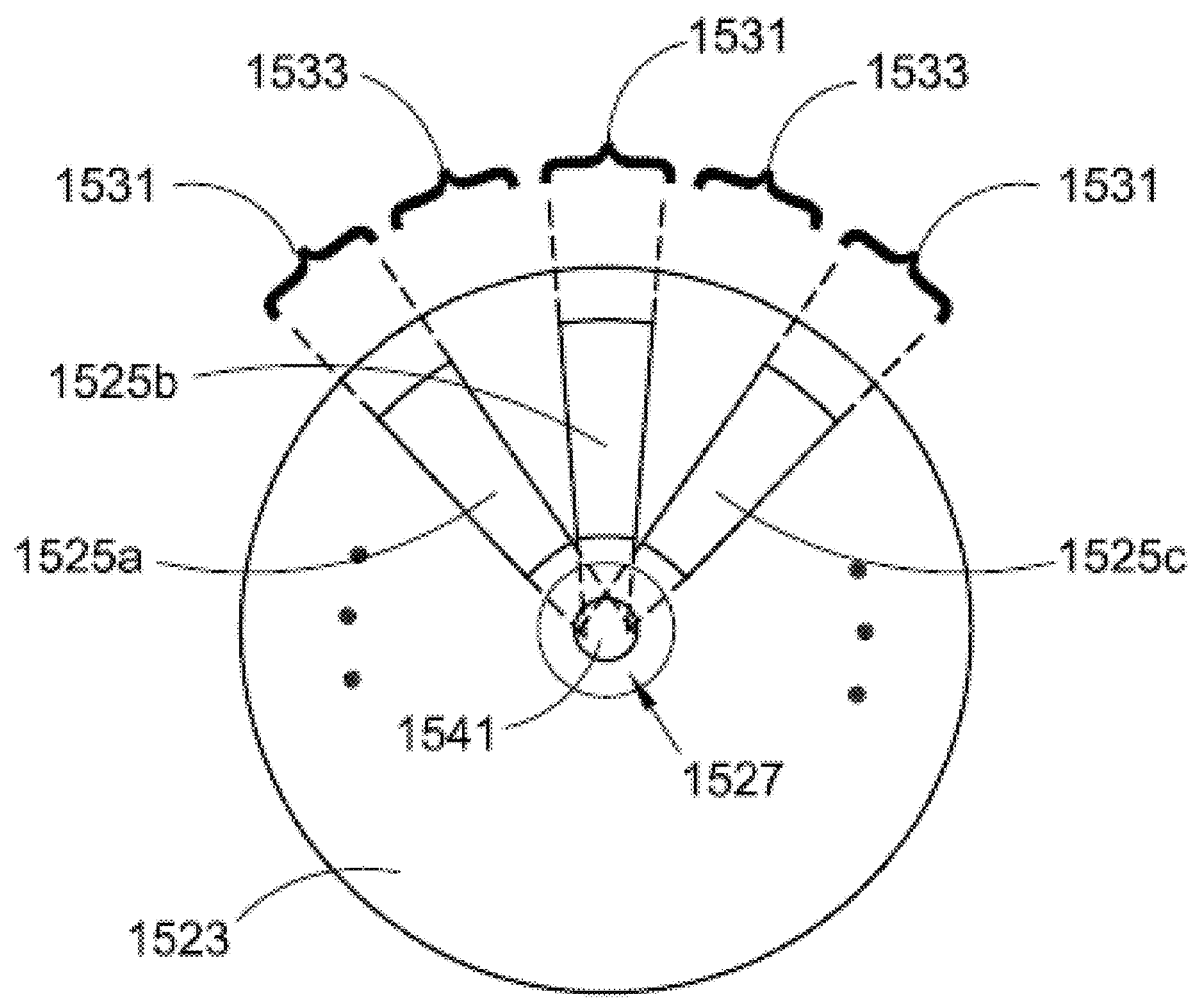
Figure 16C:
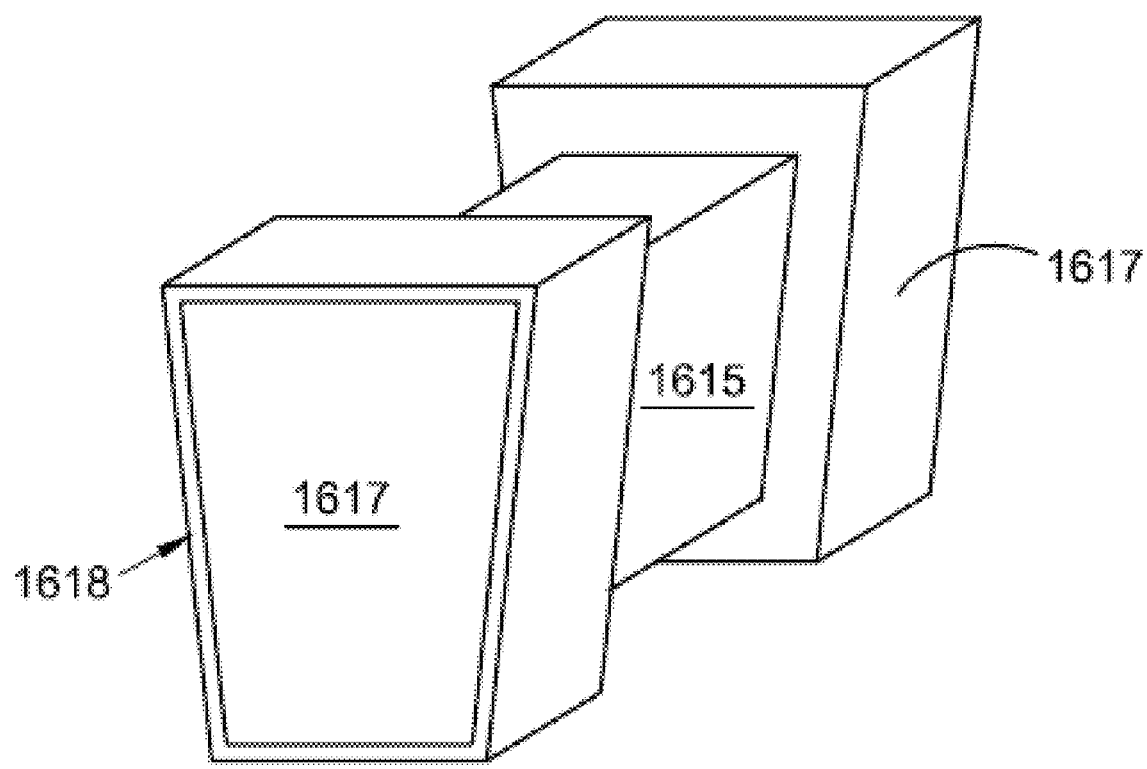

FIGS. 15A-B illustrate another embodiment of a stator assembly 1500a-b in accordance with various aspects as described herein. In FIG. 15A, the stator assembly 1500a-b may include a stator plate 1523, a set of isolated coil assemblies 1525a-c, a centrally located opening 1527, the like, or any combination thereof. The centrally located opening 1527 may be disposed through the stator plate 1523 and may be operable to receive a shaft 1541. Since the stator assembly 1500a-b is coupled to a housing of the corresponding electric motor/generator, the shaft 1541 is capable of freely rotating in the opening 1527. The stator plate 1523 may include circumferentially distributed equidistant openings through the stator plate 1523 about the centrally located opening 1527. The set of isolated coil assemblies 1525a-c may be disposed in these equidistant openings. Each coil assembly 1525a-c may be configured to include a core disposed between collector plates with each collector plate being planar to the stator plate 1523. Further, each coil assembly 1525a-c may have one or more insulated wires wound about the core. The one or more wound wires may be normal to the magnetic flux of each permanent magnet of a rotor assembly when proximate the corresponding coil assembly. Further, each coil assembly 1525a-c may be configured to either collect electrical power while the shaft 1541 is rotating or to provide electrical power to rotate the shaft 1541.

In FIG. 5B, each coil assembly 1525a-c may have the same radial angle 1531. Further, each gap between circumferentially adjacent coil assemblies 1525a-c may have the same radial angle 1533. Accordingly, the coil assembly radial angle 1531 and the coil assembly gap radial angle 1533 may be related as follows:

$$\left(\frac{360°}{NumberofCoilAssemblies}\right) = CoilAssemblyRadialAngle + CoilAssemblyGapRadialAngle \quad \text{Equation (4)}$$

Using this relationship, the coil assembly radial angle 1531 may be determined by:

$$\left(\frac{360°}{NumberofCoilAssemblies}\right) - CoilAssemblyGapRadialAngle \quad \text{Equation (5)}$$

Further, the coil assembly gap radial angle 1533 may be determined by:

$$\left(\frac{360°}{NumberofCoilAssemblies}\right) - CoilAssemblyRadialAngle \quad \text{Equation (6)}$$

Based on Equations (4)-(6), the sets of coil assemblies 1525a-c of the stator assembly 1500a-b may have many different configurations such as follows:

| No. of Stator Assemblies | Coil Assembly Radial Angle | Coil Assembly Gap Radial Angle |
| --- | --- | --- |
| 4 | 45° | 45° |
| 6 | 30° | 30° |
| 8 | 30° | 15° |
| 10 | 18° | 18° |
| 12 | 20° | 10° |
| 12 | 15° | 15° |

In another embodiment, the number of isolated coil assemblies on each stator assembly may be the same as the number of isolated permanent magnets on each rotor assembly. Further, the coil assembly radial angle of each coil assembly may be the same as the permanent magnet radial angle of each permanent magnet. Similarly, the coil assembly gap radial angle between adjacent coil assemblies may be the same as the permanent magnet gap radial angle between adjacent permanent magnets.

FIGS. 16A-F illustrate another embodiment of an isolated coil assembly 1600a-f in accordance with various aspects as described herein. In FIGS. 16A-F, the isolated coil assembly 1600a-f may include a powdered metal core 1615 disposed between collector plates 1617a,b. Further, the isolated coil assembly 1600a-f may include collector plates 1617a,b with the core 1615 disposed between the plates 1617a,b. The powdered metal core 1615 may be composed of insulated metal grains. Also, the collector plates 1617a,b may be composed of insulated metal grains. In one example, the powdered metal core 1615 or the collector plates 1617a,b may have at least a 300% initial permeability (%$\mu_o$) for a 5,000 peak alternating current (AC) flux density (gauss). In another example, the powdered metal core 1615 or the collector plates 1617a,b may have at least a 200% initial permeability (%$\mu_o$) for 1,000 gauss. In yet another example, the powdered metal core 1615 or the collector plates 1617a,b may have at least a 250% initial permeability (%$\mu_o$) for 10,000 gauss. The isolated coil assembly 1600a-f may have one or more openings 1616a-f longitudinally disposed through the coil assembly 1600a-f or the collector plates 1617a,b to reduce its weight such as described by respective FIGS. 16E-F. A lip 1618 may be disposed about an outer perimeter of each collector plate 1617a,b to allow each coil assembly 1600a-f to be fixedly disposed in an opening through a stator plate.

In FIGS. 16A-F, one or more insulated conductive wires 1614 may be wound about the powdered metal core 1615 and may be disposed between the collector plates 1617a,b. The one or more wound wires 1614 may be normal to a magnetic flux of each permanent magnet of a rotor assembly when proximate the corresponding coil assembly 1600a-f. Further, the coil assembly 1600a-f may be configurable to collect electrical power while a shaft is rotating or to provide electrical power to rotate the shaft. In one example, the one or more wound wires 1614 may include a single wire that is coupled to an electric switch that is controlled by a separate controller. The switch may be operable to configure the single wire to collect electrical power from the coil assembly 1600a-f while the shaft is rotated or to provide electrical power to the coil assembly 1600a-f to rotate the shaft. In another example, the one or more insulated wires 1614 may include a first insulated conductive wire that is configured to collect electrical power from the coil assembly 1600a-f while the shaft is rotated and a second insulated conductive wire that is configured to provide electrical power to the coil assembly 1600a-f to rotate the shaft. In this example, the two wires may be jointly or separately wound about the coil assembly 1600a-f. For jointly wound wires, the first and second wires may be twisted about the other or braided.

Figure 17:
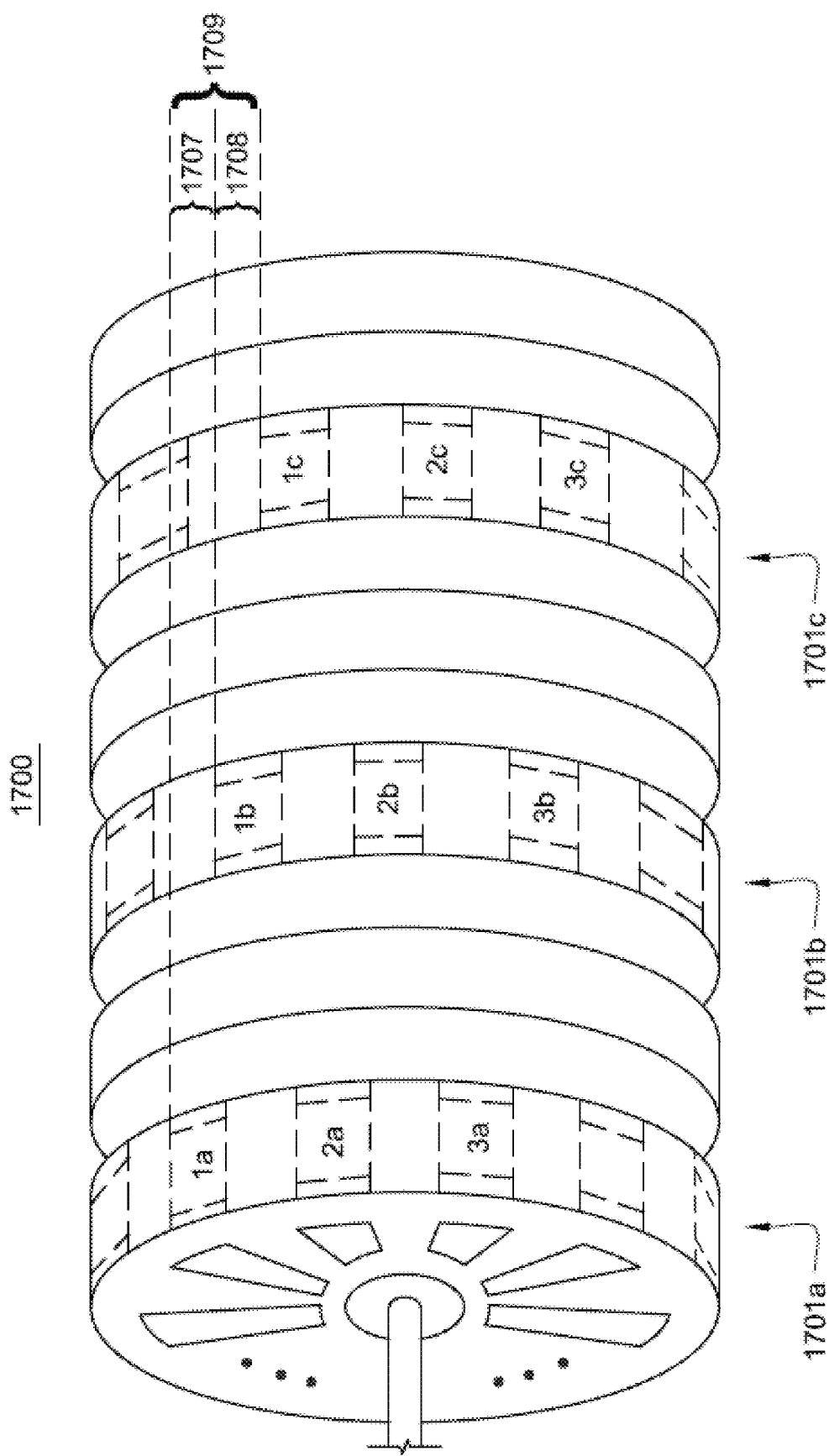
FIG. 17 illustrates one embodiment of a slice configuration for an electric motor/generator in accordance with various aspects as described herein.

FIG. 17 illustrates one embodiment of a slice configuration 1700 for an electric motor/generator in accordance with various aspects as described herein. In FIG. 17, the slice configuration 1700 may include one or more slices 1701a-c. As previously mentioned, each slice configuration 1701a-c may include rotor and stator assemblies with each rotor assembly rotatably coupled to a shaft 1703 and each stator assembly coupled to a housing of the electric motor/generator. Further, each set of isolated coil assemblies for the slices 1701a-c may have the same coil assembly gap radial angle and the same coil assembly radial angle. Similarly, each set of isolated permanent magnets for the slices 1701a-c may have the same permanent magnet gap radial angle and the same permanent magnet radial angle. For the slice configuration 1700, each slice 1701a-c may be configured to operate as an electric motor or generator. The set of isolated coil assemblies 1a-3a of the slice 1701a may have a radial angular offset 1707 about the shaft 1703 from the set of coil assemblies 1b-3b of the adjacent slice 1701b. Further, the set of isolated coil assemblies 1b-3b of the slice 1701b may have a radial angular offset 1708 about the shaft 1703 from the set of coil assemblies 1c-3c of the adjacent slice 1701c. The radial angular offset between sets of isolated coil assemblies of adjacent slices may be determined as follows:

$$\frac{CoilAssemblyGapRadialAngle + CoilAssemblyRadialAngle}{NumberOfSlices} \quad \text{Equation (7)}$$

As such, the radial angular offset between adjacent slices may be the same. For example, the radial angular offset 1707 between the adjacent slices 1701a,b is the same as the radial angular offset 1708 between the adjacent slices 1701b,c. Further, the radial angular offset for each successive slice relative to a first slice may increase linearly. For example, the radial angular offset 1709 between the slices 1701a,c is double the radial angular offset 1707 between the slices 1701a,b.

Based on Equation (7), the radial angular offset between the sets of coil assemblies of adjacent slices may have many different values such as follows:

| No. of Slices | No. of Coil Assemblies Per Stator | Coil Assembly Radial Angle | Coil Assembly Gap Radial Angle | Radial Angular Offset |
| --- | --- | --- | --- | --- |
| 2 | 4 | 45° | 45° | 45° |
| 2 | 6 | 30° | 30° | 30° |
| 3 | 8 | 22.5° | 22.5° | 15° |
| 3 | 10 | 18° | 18° | 12° |
| 3 | 12 | 15° | 15° | 10° |
| 4 | 8 | 22.5° | 22.5° | 11.25° |
| 4 | 12 | 15 | 15 | 7.5° |
| 5 | 12 | 20° | 10° | 6° |
| 5 | 12 | 15° | 15° | 6° |

Figure 18:
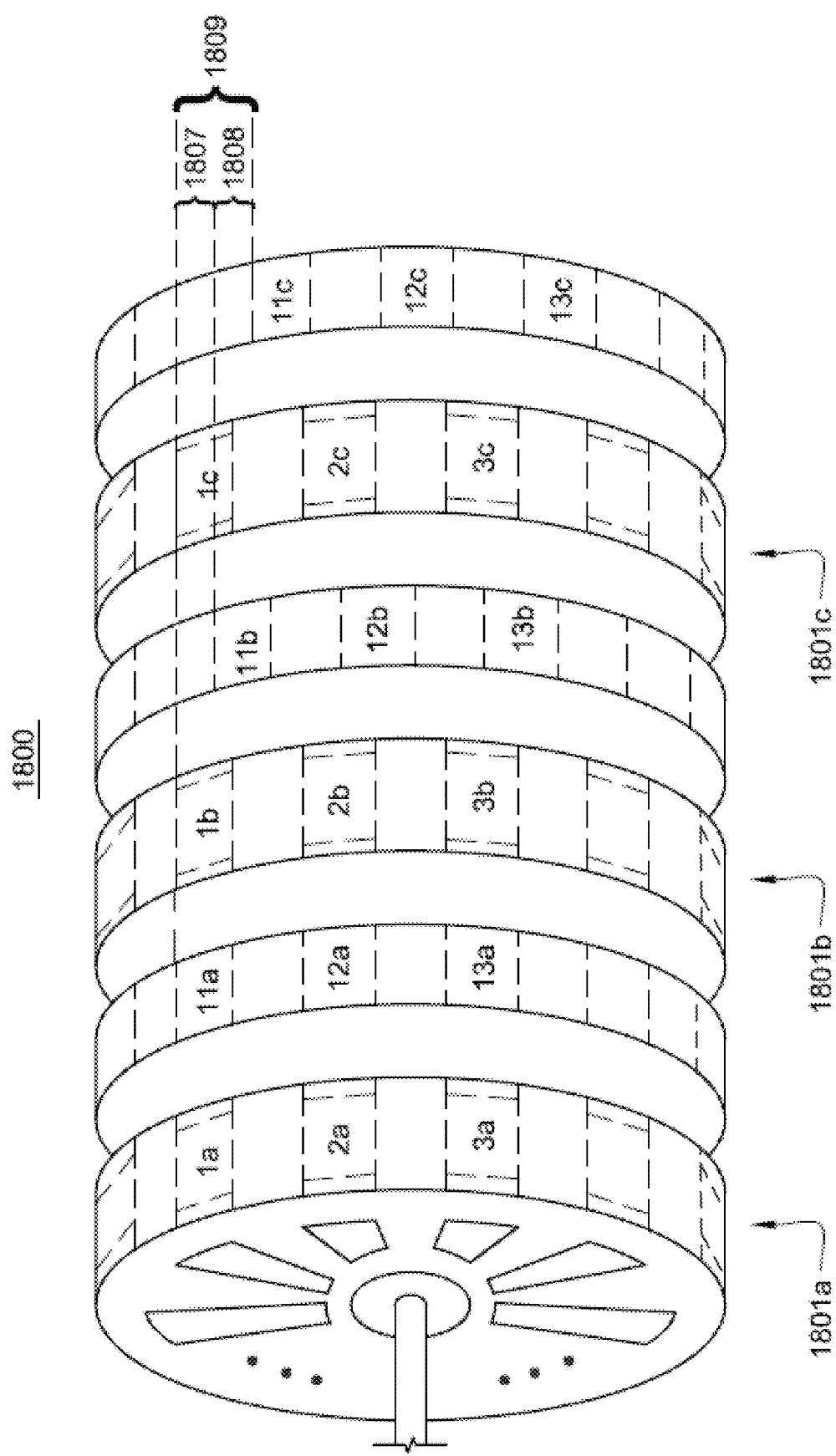
FIG. 18 illustrates another embodiment of a slice configuration for an electric motor/generator in accordance with various aspects as described herein.

FIG. 18 illustrates another embodiment of a slice configuration 1800 for an electric motor/generator in accordance with various aspects as described herein. In FIG. 18, the slice configuration 1800 may include one or more slices 1801a-c. As previously mentioned, each slice configuration 1801a-c may include rotor and stator assemblies with each rotor assembly rotatably coupled to a shaft 1803 and each stator assembly coupled to a housing of the electric motor/generator. Further, each set of isolated coil assemblies for the stators may have the same coil assembly gap radial angle and the same coil assembly radial angle. Similarly, each set of isolated permanent magnets for the rotors may have the same permanent magnet gap radial angle and the same permanent magnet radial angle. For the slice configuration 1800, each slice 1801a-c may be configured to operate as an electric motor or generator. The set of isolated coil assemblies 1a-3a, 1 b-3b, 1 c-3c of each respective slice 1801a-c may have the same alignment about the shaft 1803—no radial angular offset between sets of isolated coil assemblies of adjacent slices. Alternatively, the sets of isolated coil assemblies of adjacent slices may have a radial angular offset that corresponds to Equation (7). The set of isolated permanent magnets 11b-13b of the slice 1801b may have a radial angular offset 1807 about the shaft 1803 from the set of isolated permanent magnets 11a-13a of the adjacent slice 1801a. Further, the set of isolated permanent magnets 11c-13c of the slice 1801c may have a radial angular offset 1808 about the shaft 1803 from the set of isolated permanent magnets 11b-13b of the adjacent slice 1801b. The radial angular offset between sets of isolated permanent magnets of adjacent slices may be determined as follows:

$$\frac{MagnetGapRadialAngle + MagnetRadialAngle}{NumberOfSlices} \quad \text{Equation (8)}$$

As such, the radial angular offset between adjacent slices may be the same. For example, the radial angular offset 1807 between the adjacent slices 1801a,b is the same as the radial angular offset 1808 between the adjacent slices 1801b,c. Further, the radial angular offset for each successive slice relative to a first slice may increase linearly. For example, the radial angular offset 1809 between the slices 1801a,c is double the radial angular offset 1807 between the slices 1801a,b.

Based on Equation (8), the radial angular offset between the sets of permanent magnets of adjacent slices may have many different values such as follows:

| No. of Slices | No. of Magnets Per Rotor | Magnet Radial Angle | Magnet Gap Radial Angle | Radial Angular Offset |
|---|---|---|---|---|
| 2 | 4 | 45° | 45° | 45° |
| 2 | 6 | 30° | 30° | 30° |
| 3 | 8 | 22.5° | 22.5° | 15° |
| 3 | 10 | 18° | 18° | 12° |
| 3 | 12 | 15° | 15° | 10° |
| 4 | 8 | 22.5° | 22.5° | 11.25° |
| 4 | 12 | 15 | 15 | 7.5° |
| 5 | 12 | 20° | 10° | 6° |
| 5 | 12 | 15° | 15° | 6° |

In one embodiment, a system that is configured to operate as an electric motor or an electric generator comprises a housing, a shaft, and at least one slice assembly disposed about the shaft. The at least one slice assembly includes a rotor assembly having a rotor plate coupled to the shaft and a set of isolated permanent magnets disposed about the shaft in circumferentially distributed equidistant openings through the rotor plate. Each permanent magnet having a magnetization direction co-axial to the shaft. Further, each permanent magnet has a magnetic flux flowing in an opposite direction to a magnetic flux of each circumferentially adjacent permanent magnet. The at least one slice also includes a stator assembly having a stator plate coupled to the housing and a set of isolated coil assemblies disposed about the shaft in circumferentially distributed equidistant openings through the stator plate. Each coil assembly has one or more insulated wires wound about a powdered metal core having insulated metal grains. Further, the one or more wound wires are normal to the magnetic flux of each permanent magnet of the rotor assembly when proximate the corresponding coil assembly. In addition, the set of isolated coil assemblies is configurable to output electrical power while the shaft is rotating or to input electrical power to rotate the shaft.

In another embodiment, a set of coil assemblies of one slice may be a radial angular offset about the shaft from a set of coil assemblies of an adjacent slice.

In another embodiment, the offset may correspond to a number of slices in the system.

In another embodiment, the offset may correspond to a radial angle about the shaft between two circumferentially adjacent coil assemblies.

In another embodiment, the offset may be determined by:

$$\frac{CoilAssemblyGapRadialAngle + CoilAssemblyRadialAngle}{NumberOfSlices}.$$

In another embodiment, the offset for each successive slice relative to a first slice may linearly increase.

In another embodiment, a radial angle about the shaft of each coil assembly and a radial angle about the shaft of each gap between adjacent coil assemblies are related by:

$$\left(\frac{360°}{NumberofCoilAssemblies}\right) = $$
$$CoilAssemblyRadialAngle + CoilAssemblyGapRadialAngle.$$

In another embodiment, a radial angle about the shaft of a gap between two circumferentially adjacent coil assemblies is determined by:

$$\left(\frac{360°}{NumberofCoilAssemblies}\right) - CoilAssemblyRadialAngle.$$

In another embodiment, the powdered metal core may have at least a 300% initial permeability (%$\mu_0$) for a 5,000 peak alternating current (AC) flux density (gauss).

In another embodiment, one or more openings may be longitudinally disposed in the powdered metal core of each coil assembly so as to reduce a weight of each coil assembly.

In another embodiment, the one or more insulated wires may be configured to output electrical power from or input electrical power to the corresponding coil assembly.

In another embodiment, the one or more insulated wires may include a first wire that is configured to output electrical power from the corresponding coil assembly and a second wire that is configured to input electrical power to the corresponding coil assembly.

In another embodiment, the first and second wires may be separately wound about the coil assembly.

In another embodiment, the first and second wires may be jointly wound about the coil assembly.

In another embodiment, each of the first and second wires may be twisted or braided about the other.

In another embodiment, each coil assembly may include powdered metal endcaps having insulated metal grains.

In another embodiment, the system may include a plurality of slice assemblies with the set of isolated coil assemblies of each slice assembly being configured to either output electrical power from or input electrical power to the set of isolated coil assemblies.

In another embodiment, the system may include one or more slice assemblies configured to operate as an electric motor and one or more slice assemblies configured to operate as an electric generator.

In another embodiment, each slice assembly configured to operate as an electric generator may be positioned between slice assemblies configured to operate as an electric motor.

In another embodiment, each coil assembly may be configurable to output electrical power while the shaft is rotating or to input electrical power to rotate the shaft.

In one embodiment, a system configured to operate as an electric motor or an electric generator comprises a housing, a shaft, and a plurality of slice assemblies disposed about the shaft. Each slice assembly comprises a rotor assembly and a stator assembly. The rotor assembly has a rotor plate coupled to the shaft and a set of isolated permanent magnets disposed about the shaft in circumferentially distributed equidistant openings through the rotor plate. Each permanent magnet has a magnetization direction co-axial to the shaft with a magnetic flux of each permanent magnet flowing in an opposite direction to a magnetic flux of each circumferentially adjacent permanent magnet. The stator assembly has a stator plate coupled to the housing and a set of isolated coil assemblies disposed about the shaft in circumferentially distributed equidistant openings through the stator plate. Each coil assembly has one or more insulated conductive wires wound about a core. Further, the one or more wound wires is normal to the magnetic flux of each permanent magnet of the rotor assembly when proximate the corresponding coil assembly. Also, at least one of the set of isolated coil assemblies is configurable to output electrical power while the shaft is rotating or to input electrical power to rotate the shaft. In addition, the set of isolated coil assemblies for each stator assembly is a first radial angular offset from the set of isolated coil assemblies of an adjacent stator assembly. The first radial angular offset is based on a radial angle of a coil assembly and a number of slice assemblies. Additionally or alternatively, the set of isolated permanent magnets for each rotor assembly is a second radial angular offset from the set of isolated permanent magnets of an adjacent rotor assembly. The second radial angular offset is based on a radial angle of a coil assembly and a number of slice assemblies.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system that is configured to operate as an electric motor or an electric generator, the system comprising:
   a housing;
   a shaft; and
   a plurality of slice assemblies disposed about the shaft, each of the slice assemblies comprising:
      a rotor assembly, comprising:
         a rotor plate coupled to the shaft, the rotor plate defining:
            circumferentially distributed equidistant first openings formed through the rotor plate, each of the first openings having a first radial angle; and
            circumferentially distributed equidistant first gaps circumferentially interposed between the first openings, each of the first gaps having a second radial angle;
         and
         a set of isolated permanent magnets distributed about the shaft and extending within the respective first openings formed through the rotor plate, each of the permanent magnets having a magnetization direction co-axial to the shaft, and a magnetic flux of each of the permanent magnets flowing in a direction opposite that in which a magnetic flux of a circumferentially adjacent one of the permanent magnets flows;
      and
      a stator assembly, comprising:
         a stator plate coupled to the housing, the stator plate defining:
            circumferentially distributed equidistant second openings formed through the stator plate, each of the second openings having a third radial angle; and
            circumferentially distributed equidistant second gaps circumferentially interposed between the second openings, each of the second gaps having a fourth radial angle;
         and
         a set of isolated coil assemblies distributed about the shaft and extending within the respective second openings formed through the stator plate, each of the coil assemblies comprising one or more insulated conductive wires wound about a powdered metal core having insulated metal grains, the wound insulated conductive wires being normal to the magnetic flux of each of the permanent magnets of the rotor assembly when each of the permanent magnets is proximate the corresponding coil assembly, and at least one of the isolated coil assemblies being configurable to output electrical power while the shaft is rotating or to input electrical power to rotate the shaft;
   wherein:
   (i) the set of isolated permanent magnets of each of the slice assemblies is offset by a fifth radial angle about the shaft from the set of isolated permanent magnets of an axially adjacent one of the slice assemblies; and
      the fifth radial angle is determined by multiplying a reciprocal of the total number of slice assemblies in the system by a sum of the first and second radial angles;
   and/or
   (ii) the set of isolated coil assemblies of each of the slice assemblies is offset by a sixth radial angle about the shaft from the set of isolated coil assemblies of an axially adjacent one of the slice assemblies; and
      the sixth radial angle is determined by multiplying the reciprocal of the total number of slice assemblies in the system by a sum of the third and fourth radial angles.

2. The system of claim 1,
   wherein the system comprises the elements recited in romanette (ii); and
   wherein the sum of the third and fourth radial angles equals 360° divided by a total number of the coil assemblies in each of the stator assemblies.

3. The system of claim 1, wherein the powdered metal core has at least a 300% initial permeability (%$\mu_0$) for a 5,000 peak alternating current (AC) flux density (gauss).

4. The system of claim 1, wherein one or more third openings is/are formed longitudinally in the powdered metal core of each of the coil assemblies so as to reduce a weight of each of the coil assemblies.

5. The system of claim 1, wherein each of the one or more insulated conductive wires is configured to output electrical power from or provide electrical power to the corresponding coil assembly.

6. The system of claim 1, wherein each of the coil assemblies also includes powdered metal endcaps having insulated metal grains.

7. The system of claim 1, wherein each of the coil assemblies is configurable to output electrical power while the shaft is rotating or to input electrical power to rotate the shaft.

8. The system of claim 1, wherein the system comprises the elements recited in romanette (i); and
wherein the sum of the first and second radial angles equals 360° divided by a total number of the permanent magnets in each of the rotor assemblies.

9. The system of claim 1, wherein the system comprises the elements recited in each of romanettes (i) and (ii).

10. The system of claim 1, wherein the set of isolated coil assemblies of each slice assembly is configured to either output electrical power from the set of isolated coil assemblies or input electrical power to the set of isolated coil assemblies.

11. The system of claim 10, wherein the plurality of slice assemblies comprises:
one or more slice assemblies configured to operate as an electric motor, and
one or more slice assemblies configured to operate as an electric generator.

12. The system of claim 10, wherein the one or more slice assemblies configured to act as the electric motor comprises two or more slice assemblies configured to act as the electric motor; and
wherein one of the one or more slice assemblies configured to operate as the electric generator is positioned between two of the two or more slice assemblies configured to operate as the electric motor.

13. The system of claim 1, wherein the one or more insulated conductive wires of each of the coil assemblies include:
a first wire that is configured to output electrical power from the corresponding coil assembly; and
a second wire that is configured to input electrical power to the corresponding coil assembly.

14. The system of claim 13, wherein the first and second wires are separately wound about the corresponding coil assembly.

15. The system of claim 13, wherein the first and second wires are jointly wound about the corresponding coil assembly.

16. The system of claim 15, wherein each of the first and second wires are twisted or braided about the other.

* * * * *